United States Patent [19]
Suganuma

[11] Patent Number: 5,563,478
[45] Date of Patent: Oct. 8, 1996

[54] DRIVE CONTROL DEVICE FOR AN ULTRASONIC MOTOR

[75] Inventor: Ryoichi Suganuma, Yokohama, Japan

[73] Assignee: Nikon Corporation, Tokyo, Japan

[21] Appl. No.: 364,011

[22] Filed: Dec. 27, 1994

Related U.S. Application Data

[63] Continuation of Ser. No. 105,980, Aug. 13, 1993, abandoned.

[30] Foreign Application Priority Data

Aug. 18, 1992 [JP] Japan ................................. 4-219447
Aug. 18, 1992 [JP] Japan ................................. 4-219448

[51] Int. Cl.⁶ ................................................ H01L 41/08
[52] U.S. Cl. ........................................ 318/116; 310/316
[58] Field of Search ............................... 310/316, 317, 310/319, 323; 318/116

[56] References Cited

U.S. PATENT DOCUMENTS

| | | | |
|---|---|---|---|
| Re. 34,409 | 10/1993 | Hakamata et al. ................. | 310/316 |
| 4,658,172 | 4/1987 | Izukawa ............................ | 310/316 |
| 4,692,649 | 9/1987 | Izukawa et al. ................... | 310/316 |
| 4,794,294 | 12/1988 | Shimizu et al. ................... | 310/316 |
| 4,954,742 | 9/1990 | Izukawa ............................ | 310/316 |
| 5,001,404 | 3/1991 | Kataoka ............................ | 318/116 |
| 5,162,708 | 11/1992 | Naito et al. ...................... | 318/116 |
| 5,247,221 | 9/1993 | Atsuta .............................. | 310/316 X |

*Primary Examiner*—Mark O. Budd
*Attorney, Agent, or Firm*—Oliff & Berridge

[57] ABSTRACT

Based upon the output signals from two detector electrodes provided in positions which differ from those of input electrodes on a piezoelectric transducer element, it is detected in what order resonance frequency band the drive frequency of an ultrasonic motor is included, and the drive frequency of the ultrasonic motor is controlled so as to be within a predetermined frequency band.

Further, the resonance frequency band for the ultrasonic motor is switched over to any one of several resonance frequency bands, and, based upon the output signals from the two detector electrodes provided on the piezoelectric transducer element, it is detected in what order resonance frequency band the drive frequency is included, and the drive frequency of the ultrasonic motor is controlled so as to be within the resonance frequency band which has been switched over to.

22 Claims, 19 Drawing Sheets

DRIVE CONTROL DEVICE FOR AN ULTRASONIC MOTOR

This is a Continuation of application Ser. No. 08/105,980 filed Aug. 13, 1993, now abandoned.

BACKGROUND OF THE INVENTION

1. Field of the Invention

The present invention relates to a drive control device for an ultrasonic motor, and more particularly relates to a drive control device for an ultrasonic motor, which can perform control so as to ensure that the drive frequency lies within a predetermined resonance frequency band.

2. Description of Related Art

Because an ultrasonic motor provides high output power at low speed, and for other reasons, it has very suitable characteristics for use in actuators etc., and accordingly it has much potential in various fields of industrial application.

The general construction and function of a rotating type ultrasonic motor will now be explained by way of example. FIG. 14 is a sectional view showing the general construction of a typical such rotating type ultrasonic motor. Referring to this figure, the reference numeral 11 denotes the movable member of the ultrasonic motor, in other words the rotor thereof in the case of a rotating type ultrasonic motor, and to this rotor 11 there is fixed a slider member 11a. The reference numeral 12 denotes a stator of the ultrasonic motor, which comprises an elastic member 12a and a piezoelectric transducer element 12b fixed to said elastic member 12a. The piezoelectric transducer element 12b converts electrical energy into mechanical energy, thus playing the role of an electrical energy to mechanical energy conversion element. The stator 12 is held fixed in place between a tubular support member 13a, which is formed with an internal step and a screw thread leading to said internal step, and a securing ring 13b formed with an external screw thread, which is screwed down into said tubular support member 13a so as to clamp the stator 12 against said internal step thereof. Further, the rotor 11 is pressed against some element not shown in the figure which exerts resistance to said pressure, whereby the rotor 11 is pressed against the stator 12 into intimate contact therewith.

FIG. 15 is a figure showing a typical arrangement for electrodes formed on the piezoelectric transducer element 12b in the rotating type ultrasonic motor of FIG. 14. These electrodes divide up the piezoelectric transducer element 12b into a plurality of electrode portions. These electrodes transmit a supply of electrical power for driving the ultrasonic motor, and also serve for sensing the operational state of the ultrasonic motor. Those of the electrodes designated in FIG. 15 by circular black dots are electrodes of positive polarity, while the electrodes in FIG. 15 which are not designated by any circular black dots are electrodes of negative polarity. The electrode groups 14A and 14B are input electrode groups as shown in the figure, and each electrode in said electrode groups 14A and 14B has circumferential extent one half of a wavelength $\lambda$, and neighboring electrodes in these electrode groups 14A and 14B are at a distance apart which yields a phase difference $\lambda/4$. An electrode 14M of circumferential extent $\lambda/4$ is provided in one of the gaps defined between the two electrode groups 14A and 14B, and is normally used as a detector electrode for detecting the vibrational condition of the progressive wave which is set up in the elastic member 12a. Another electrode 14C of circumferential extent $3*\lambda/4$, generally termed a common electrode, is provided in the other one of the gaps defined between the two electrode groups 14A and 14B, and is normally used as a ground electrode. The piezoelectric transducer element 12b is fixed to the elastic member 12a, and AC drive signals differing in phase by $\pi/2$ are supplied to the two input electrode groups 14A and 14B, whereby a progressive wave is generated in the elastic member 12a and the rotor 11 which is pressed against said elastic member 12a is turned by this progressive wave.

In order to drive such an ultrasonic motor stably and reliably, the frequency of the AC drive signals which are supplied to the two input electrode groups 14A and 14B (hereinafter referred to as the drive frequency) is required to be set to the most suitable frequency for the individual ultrasonic motor in the particular conditions of use at the moment. This most suitable drive frequency is a frequency which is somewhat higher than an inherent resonance frequency of the ultrasonic motor, and, when the ultrasonic motor is driven at this most suitable drive frequency, the amplitude of the progressive wave is large due to resonance of the elastic member 12a, whereby the efficiency of the ultrasonic motor is at a desirably high level. If the drive frequency for the ultrasonic motor deviates from the most suitable frequency in the neighborhood of this resonance frequency, then the amplitude of the progressive wave becomes smaller and said progressive wave may become unable to drive the ultrasonic motor, or unusual sounds may be generated during motor operation, or it may become impossible to drive the ultrasonic motor properly and it may start to rotate in the opposite direction from the desire operational direction.

However, the resonance frequency of the ultrasonic motor is always changing due to change of temperature and change of load, and therefore it is necessary to change the setting for the most suitable drive frequency for the ultrasonic motor according to this changed resonance frequency. Although many and various drive control devices for an ultrasonic motor have been proposed in which an attempt is made always to provide the most suitable drive frequency even if the resonance frequency changes, the following types of such drive control devices are representative:

(1) In a first type of drive control device, the output voltage from the detector electrode is detected, and the drive frequency is controlled so as to bring this output voltage to a voltage value corresponding to the most suitable drive frequency.

(2) In a second type of drive control device, the phase difference between the waveform of the output voltage from the detector electrode and the waveform of an input voltage supplied to an input electrode group is detected, and the drive frequency is controlled so as to bring this phase difference to a desire phase difference value.

(3) In a third type of drive control device, the phase difference between the waveform of an input voltage supplied to an input electrode group and the waveform of the drive current flowing through said input electrode group is detected, and the drive frequency is controlled so as to bring this phase difference to a predetermined phase difference value.

Although various other such drive control devices for an ultrasonic motor have been proposed, explanation thereof will be curtailed in the interests of brevity.

FIG. 16 is a block diagram showing the structure of a prior art type drive control device for an ultrasonic motor such as the one shown in FIGS. 14 and 15. This drive control device is an example of one which has been proposed by the applicant of the present application, and is of the type described generally in (2) above. If particular details are required, reference should be made to Japanese Patent Laying-Open Publication 62-251490. This drive control device for an ultrasonic motor comprises: an oscillator 21 which outputs the drive frequency f; a waveform shaping device 22; a phase shifter 23 which shifts the drive signal input to the input electrode groups 14A and 14B by exactly π/2; power amplifiers 24 and 25; a phase difference calculation circuit 29 which calculates the phase difference Φ between the output voltage waveform output from the detector electrode 14M and the drive voltage waveform input to the input electrode group 14A; a comparator 30 which compares this phase difference Φ with a reference phase difference Φopt and outputs the amount ΔΦ of deviation between them; a referencer 31 which outputs the reference phase difference Φopt; and a Φ to f conversion calculator 32 which converts this amount ΔΦ of deviation into an amount Δf by which the drive frequency f should be increased or decreased. Further, the reference numerals 27 and 28 denote load matching inductors.

The phase difference Φ between the output voltage waveform output from the detector electrode 14M and the drive voltage waveform input to the input electrode group 14A is calculated by the phase difference calculation circuit 29. The comparator 30 compares this phase difference Φ with a reference phase difference Φopt which is set by the referencer 31, and outputs the amount ΔΦ of deviation between them. Now, this reference phase difference Φopt is the phase difference when the ultrasonic motor is being stably driven by the most suitable drive frequency, which is slightly higher than its resonance frequency. Next, the Φ to f conversion calculator 32 converts this amount ΔΦ of deviation into an amount Δf by which the drive frequency f should be increased or decreased, and this amount Δf is output to the oscillator 21. The oscillator 21 then increases or decreases the drive frequency f by just this amount Δf. In this manner, the drive frequency f for the ultrasonic motor is always controlled to be the most suitable drive frequency which is somewhat higher than the resonance frequency of the ultrasonic motor, so that said ultrasonic motor can thereby be stably driven.

FIG. 17 shows together, the way in which the drive speed N of the ultrasonic motor varies with respect to the drive frequency f, and the way in which the phase difference Φ between the drive voltage waveform and the detector voltage waveform varies with respect to the drive frequency f. In this figure, it is shown that initially the ultrasonic motor was being driven so as to operate according to the characteristic expressed by the drive curve NA and the phase difference curve ΦA, and that, due to change of temperature or the load on the ultrasonic motor or the like, the driving conditions of the ultrasonic motor altered so that its operation came to be according to the characteristic expressed by the drive curve NB and the phase difference curve ΦB. In this figure, whichever of these characteristics properly describes the operation of the ultrasonic motor, the phase difference Φ is shown as being the same value for the most suitable drive frequency f1 or f2 for the ultrasonic motor, and therefore, if this phase difference value is set to the reference phase difference value Φopt described above, the ultrasonic motor can thereby always be stably driven.

A resonance frequency of the ultrasonic motor exists for each order of resonance, and normally among them the resonance frequency band of the order that shows the best drive characteristic is set as the drive frequency band for the ultrasonic motor, and the ultrasonic motor is drive controlled so that its driving frequency is kept within that drive frequency band. Hereinafter in this specification, this resonance frequency band of the order that shows the best drive characteristic for the ultrasonic motor will be termed the most suitable resonance frequency band.

On the other hand, if for example the ultrasonic motor is being driven at extremely low rotational speed, the variation in speed is small in the case of driving said ultrasonic motor with a frequency of a resonance frequency band other than said most suitable frequency band, rather than driving said ultrasonic motor with a frequency in the most suitable resonance frequency band, and such operation exhibits excellent characteristics. Accordingly, when the ultrasonic motor is to be driven at normal speed, said ultrasonic motor is driven with a frequency in the most suitable resonance frequency band, and, when said ultrasonic motor is to be driven at extremely low rotational speed, the drive frequency for driving said ultrasonic motor is switched over from the most suitable resonance frequency band to another resonance frequency band, and thereafter said ultrasonic motor is driven with a frequency in said other resonance frequency band.

However, with such a prior art type of drive control device for an ultrasonic motor, when due to temperature variation or change of the load on the motor the drive frequency deviates from the most suitable resonance frequency band or from the resonance frequency band for operation at extremely low rotational speed, then problems can arise of inconveniences and improper operation, such as the drive frequency not reliably returning to said most suitable resonance frequency band or to said resonance frequency band for operation at extremely low rotational speed, or of the driving operation of the ultrasonic motor becoming unstable, or of the generation of unusual noise or the like.

Now, the resonance frequency band which is used for the drive frequency band for the ultrasonic motor will be explained. Considering the piezoelectric transducer element 12b shown in FIG. 15 as an example, because the circumferential extent of any one of the electrodes included in the input electrode groups 14A and 14B is λ/2, therefore the total circumferential extent of the input electrode group 14A is equal to 5*λ, as is the total circumferential extent of the input electrode group 14B. Further, the circumferential extent of the common electrode 14C is 3*λ/4, and the circumferential extent of the detector electrode 14M is λ/4, so adding these all together the total circumferential extent of all the electrodes is 11*λ. It is usual for the number of waves in the progressive wave generated on the stator 12 when the ultrasonic motor is being driven to agree with the number of waves on the divided electrode of the piezoelectric transducer element 12b. I.e., with the piezoelectric transducer element 12b of circumferential extent 11*λ shown in FIG. 15, the eleventh order resonance frequency band which generates the eleventh order progressive vibration wave is usual; and this is a most suitable resonance frequency band for use as a drive frequency band for the ultrasonic motor.

As shown in FIGS. 18 and 19, on the low frequency side of this eleventh order resonance frequency band there exist in order lower order resonance frequency bands, i.e. the tenth order resonance frequency band, the ninth order resonance frequency band, etc., while on the high frequency side of this eleventh order resonance frequency band there exist in order higher order resonance frequency bands, i.e. the twelfth order resonance frequency band, the thirteenth order resonance frequency band, etc..

FIG. 18 is a figure showing, together, the way in which the drive speed N of the ultrasonic motor varies with respect to the drive frequency F, and the way in which the output voltage VM from the detector electrode varies with respect to the drive frequency F. With a drive control device of the type described generally in (1) above, the drive frequency is set to F11 so as to make the output voltage from the detector electrode be equal to VM1. This drive frequency F11 is the frequency of the most suitable eleventh order resonance frequency band. Further, when the ultrasonic motor is to be driven at extremely low rotational speed, the drive frequency is set to F120 so as to make the output voltage from the detector electrode be equal to VM2. This drive frequency F120 has more excellent drive characteristics when driving the ultrasonic motor at extremely low speed than does the frequency of the most suitable eleventh order resonance frequency band, and for example may be the frequency of the twelfth order resonance frequency band.

However, there are other frequencies F9, F10, F12, F13 ... which make the output voltage VM from the detector electrode to be equal to VM1, as well as the frequency of the most suitable eleventh order resonance frequency band, and similarly there are other frequencies F90, F100, F110, F130 ... which make the output voltage VM from the detector electrode to be equal to VM2, as well as the frequency of the twelfth order resonance frequency band. If temporarily the drive frequency F should wander from the previously set most suitable eleventh order or twelfth order resonance frequency band, whichever of them it is set to, and should come to be equal to one of these other frequencies, then it will not return to the proper frequency band.

FIG. 19 is a figure showing, together, the way in which the drive speed N varies with respect to the drive frequency F, and the way in which the phase difference Φ between the detector voltage and the drive voltage varies with respect to the drive frequency F. With a drive control device of the type described generally in (2) above, the drive frequency F for the ultrasonic motor is set so as to make the phase difference Φ between the detector voltage and the drive voltage to be equal to a phase difference value Φ1 corresponding to the drive frequency F11' of the most suitable eleventh order resonance frequency band. Further, when the ultrasonic motor is to be driven at extremely low rotational speed, the drive frequency F is set so as to make the phase difference Φ to be equal to Φ2. This drive frequency F120 has more excellent drive characteristics when driving the ultrasonic motor at extremely low speed than does the frequency of the most suitable eleventh order resonance frequency band, and for example may be the phase difference Φ2 corresponding to the frequency of the twelfth order resonance frequency band.

However, there are other frequencies F10', F12', F13' ... which make the phase difference Φ to be equal to Φ1, as well as the frequency of the most suitable eleventh order resonance frequency band, and similarly there are other frequencies F130' ... which make the phase difference Φ to be equal to Φ2, as well as the frequency of the twelfth order resonance frequency band. If temporarily the drive frequency F should wander from the previously set most suitable eleventh order or twelfth order resonance frequency band, whichever of them it is set to, and should come to be equal to one of these other frequencies, then it will not return to the proper frequency band.

A detailed explanation will not be given in this specification in view of the desirability of brevity, but the same type of problem arises with a drive control device of the type described generally in (3) above, in which the drive frequency is controlled based upon the phase difference between the waveform of an input voltage supplied to an input electrode and the waveform of the drive current flowing through said input electrode.

It has been conceived of to control the drive frequency for the ultrasonic motor to be the frequency of the most suitable resonance frequency band or the frequency of a resonance frequency band for driving the ultrasonic motor at extremely low rotational speed, and, in order to drive the ultrasonic motor in a stable fashion, to limit the output frequency band of the setting circuit for setting the drive frequency, or the output frequency band of the drive frequency generating device, to the most suitable resonance frequency band or to the frequency of the resonance frequency band for driving the ultrasonic motor at extremely low rotational speed, whereby it may be ensured that the drive frequency for the ultrasonic motor is never included in any other resonance frequency band. However this approach is not particularly desirable, because the construction in order to provide this function of the drive frequency setting circuit or the construction of the drive frequency generating circuit becomes complicated, and further circuitry is required in order to compensate for changes in the output frequency due to the effects of changes in temperature and of changes in the load on the ultrasonic motor and the like.

Further, since the resonance frequency band of the ultrasonic motor varies due to changes in temperature and changes in load, there are problems in making the frequency band of the drive frequency setting circuit or the frequency band of the drive frequency generating circuit always agree with the most suitable resonance frequency band or the resonance frequency band for driving the ultrasonic motor at extremely low rotational speed.

Yet further, since individual ultrasonic motors, even of the same specification, inevitably differ from one another with regard to resonance frequency band, it is necessary to perform individual adjustment for each individual ultrasonic motor in order to set the frequency band of its drive frequency setting circuit or the frequency band of its drive frequency generating circuit appropriately, and a problem thereby arises of great labor in manufacture of the ultrasonic motor, which inevitably entails high cost.

In order to prevent deviation of the drive frequency for the ultrasonic motor by limiting the output frequency band of the drive frequency setting circuit or of the drive frequency generating circuit, it is necessary to set said output frequency band narrower than the most suitable resonance frequency band or the resonance frequency band for driving the ultrasonic motor at extremely low rotational speed, so as to take into account deviation of the resonance frequency band of the ultrasonic motor due to changes in temperature and changes in load, as described above. However, when the output frequency band of the drive frequency setting circuit or of the drive frequency generating circuit is set narrower than the most suitable resonance frequency band or than the resonance frequency band for driving the ultrasonic motor at extremely low rotational speed, then it is not possible to set the drive frequency for the ultrasonic motor in the neighborhood of the upper limit value or in the neighborhood of the lower limit value of the most suitable resonance frequency band or of the resonance frequency band for driving the ultrasonic motor at extremely low rotational speed, and accordingly the range of variation of speed of the ultrasonic motor is undesirably narrowed.

Although by way of example the above explanation of the problems associated with the prior art has been made in terms of an ultrasonic motor which comprises the piezoelectric transducer element 12b shown in FIG. 15, similar problems arise with other prior art types of ultrasonic motor of different construction.

SUMMARY OF THE INVENTION

The object of the present invention is to provide a drive control device for an ultrasonic motor, which can drive the ultrasonic motor stably at a drive frequency which lies reliably within a predetermined resonance frequency band.

In order to attain this object, there is proposed, according to a first aspect of the present invention, a drive control device for an ultrasonic motor, in which two AC signals having a fixed phase difference are supplied to two input electrode groups on an electromagnetic energy to mechanical energy conversion element, and which drives a movable element by generating a progressive wave in a fixed element by said electromagnetic energy to mechanical energy conversion element, wherein at least two detector electrodes are provided on said electromagnetic energy to mechanical energy conversion element, and comprising a frequency band control means which, based upon the output signals from said detector electrodes, performs control so as to bring the frequency of said two AC signals to be within a predetermined order resonance frequency band.

Further, there is proposed, according to a second aspect of the present invention, a drive control device for an ultrasonic motor, in which two AC signals having a fixed phase difference are supplied to two input electrode groups on an electromagnetic energy to mechanical energy conversion element, and which drives a movable element by generating a progressive wave in a fixed element by said electromagnetic energy to mechanical energy conversion element, comprising: a frequency band control means which, based upon the output signals from at least two detector electrodes provided on said electromagnetic energy to mechanical energy conversion element, performs control so as to bring the frequency of said two AC signals to be within a predetermined order resonance frequency band; and a drive frequency control means which, after the frequency of said two AC signals has reached the frequency of the predetermined order resonance frequency band, controls said frequency of said two AC signals to be a predetermined drive frequency.

Yet further, there is proposed, according to a third aspect of the present invention, a drive control device for an ultrasonic motor which drives a movable element by generating a progressive wave in a fixed element by an electromagnetic energy to mechanical energy conversion element, comprising: a frequency setting means which sets the drive frequency of said ultrasonic motor; a resonance order detection means which detects in which order of resonance frequency band the drive frequency of said ultrasonic motor lies, based upon the output signals from at least two detector electrodes which are provided on said electromagnetic energy to mechanical energy conversion element; a frequency band control means which controls said frequency setting means so as to bring the drive frequency of said ultrasonic motor to the frequency of a predetermined order resonance frequency band, based upon the order of resonance frequency band detected by said resonance order detection means; a phase shifting oscillator means, which generates two AC signals with the drive frequency set by said frequency setting means, having a fixed phase difference between them; and a power amplifier means which amplifies said two AC signals which are generated by said phase shifting oscillator means, and supplies them to two input electrode groups which are provided on said electromagnetic energy to mechanical energy conversion element.

Based upon the output signals from said two detector electrodes which are provided on said electromagnetic energy to mechanical energy conversion element, it is detected in which order of resonance frequency band the drive frequency of said ultrasonic motor lies, and said drive frequency setting means is controlled so as to bring the drive frequency of said ultrasonic motor to the frequency of a predetermined order resonance frequency band. By doing this, even if changes occur in the driving conditions of the ultrasonic motor due to temperature variation or variation in the load on the ultrasonic motor, nevertheless said ultrasonic motor can be operated stably with a drive frequency in the predetermined most suitable resonance frequency band.

And, yet further, there is proposed, according to a fourth aspect of the present invention, a drive control device for an ultrasonic motor which drives a movable element by generating a progressive wave in a fixed element by an electromagnetic energy to mechanical energy conversion element, comprising: a frequency setting means which sets the drive frequency of said ultrasonic motor; a frequency band switchover means which switches over the resonance frequency band of said ultrasonic motor to any one of a plurality of resonance frequency bands; a resonance order detection means which detects in which order of resonance frequency band the drive frequency of said ultrasonic motor lies, based upon the output signals from at least two detector electrodes which are provided on said electromagnetic energy to mechanical energy conversion element; a frequency band control means which controls said frequency setting means so as to bring the drive frequency of said ultrasonic motor to the frequency of the resonance frequency band switched over to by said frequency band switchover means, based upon the order of resonance frequency band detected by said resonance order detection means; a phase shifting oscillator means which generates two AC signals with the drive frequency set by said frequency setting means, having a fixed phase difference between them; and a power amplifier means which amplifies said two AC signals which are generated by said phase shifting oscillator means, and supplies them to two input electrode groups which are provided on said electromagnetic energy to mechanical energy conversion element.

Based upon the output signals from said two detector electrodes which are provided on said electromagnetic energy to mechanical energy conversion element, it is detected in which order of resonance frequency band the drive frequency of said ultrasonic motor lies, and said drive frequency setting means is controlled so as to bring the drive frequency of said ultrasonic motor to the frequency of the resonance frequency band which is switched over to by said frequency band switchover means. By doing this, even if changes occur in the driving conditions of the ultrasonic motor due to temperature variation or variation in the load on the ultrasonic motor, nevertheless said ultrasonic motor can be operated stably with a drive frequency in the desire resonance frequency band which has been switched over to.

DESCRIPTION OF THE PREFERRED EMBODIMENTS

Preferred Embodiment 1

Figure 14:
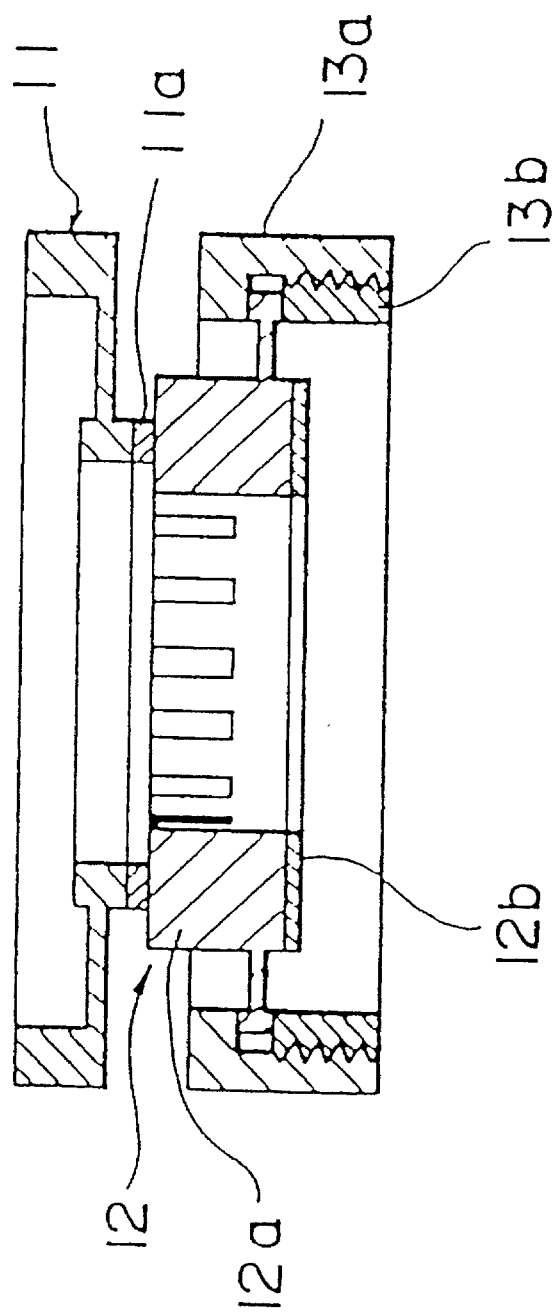
FIG. 14 is a sectional view showing the general construction of a rotating type ultrasonic motor.

The first preferred embodiment of the drive control device of the present invention for an ultrasonic motor will now be described with reference to FIGS. 1 through 8 which illustrate it, and with reference to its application for control of the exemplary rotating type ultrasonic motor shown in FIGS. 14 and 15.

First, the method for detecting the order of the resonance frequency band in which the frequency of the driving voltage which is supplied to the ultrasonic motor is included will be explained.

Figure 15:
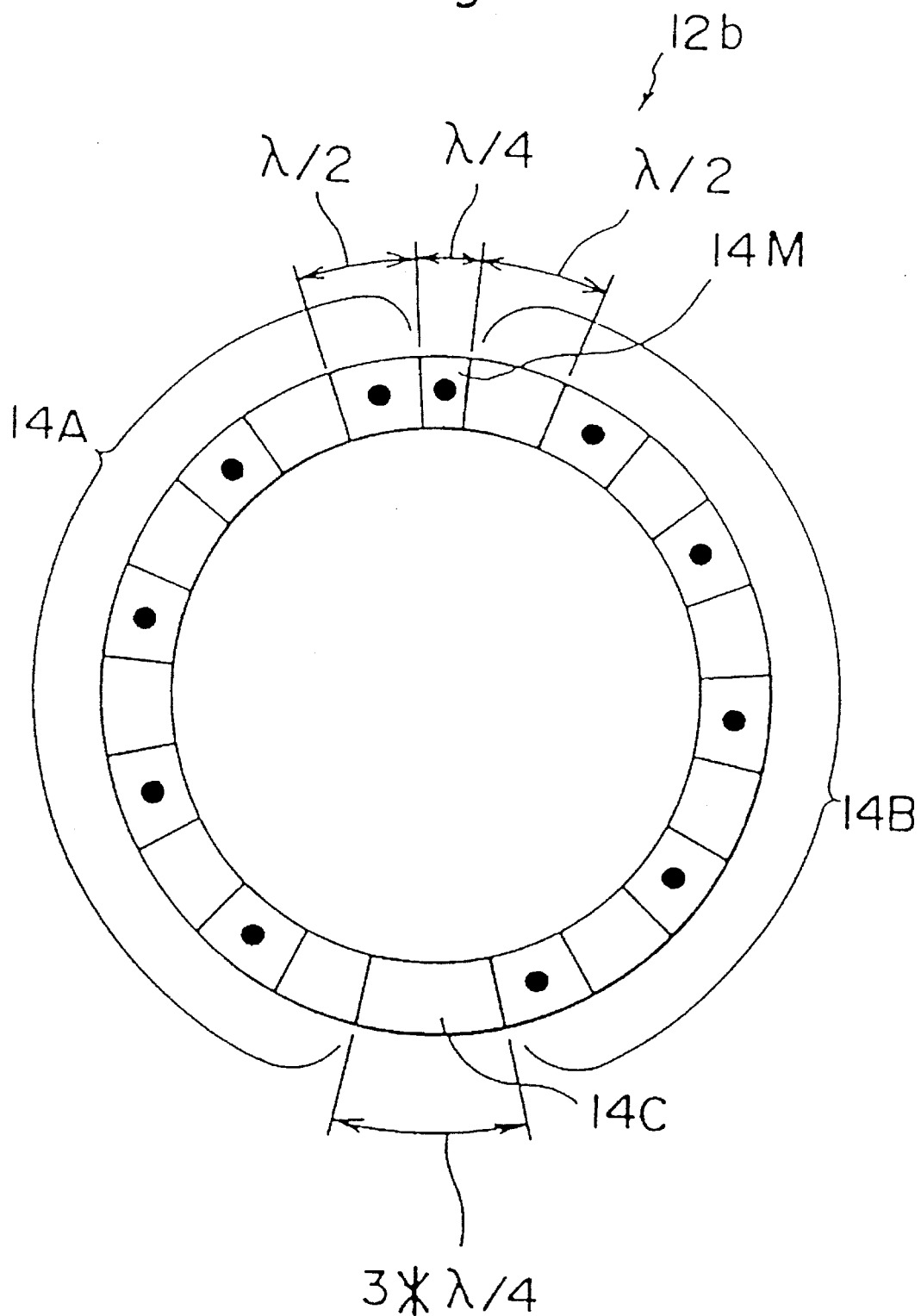
FIG. 15 is a figure showing the electrode arrangement of a piezoelectric transducer element in the rotating type ultrasonic motor of FIG. 14.
Figure 16:
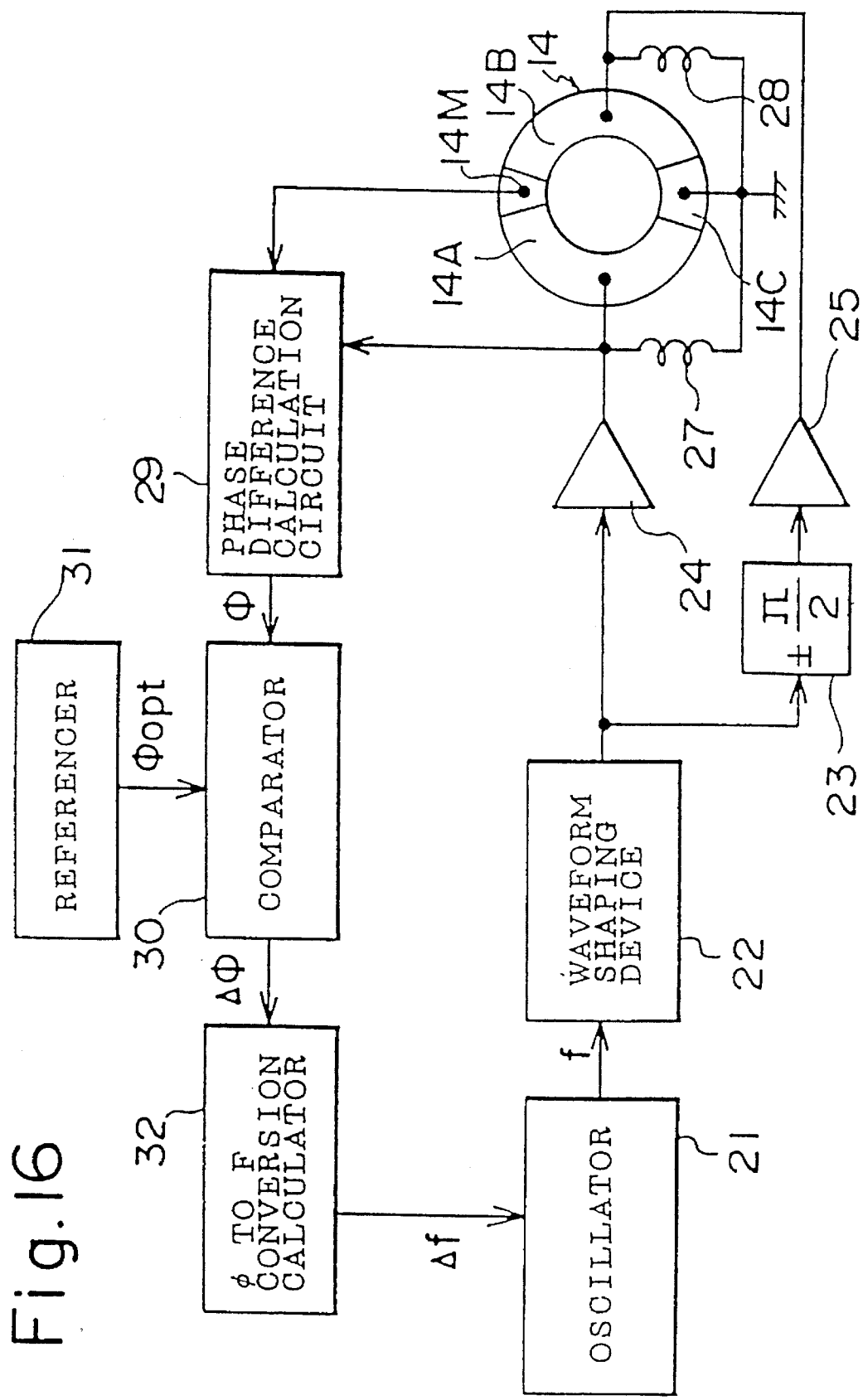
FIG. 16 is a block diagram showing the structure of a prior art type drive control device for an ultrasonic motor such as the one shown in FIGS. 14 and 15.
Figure 17:
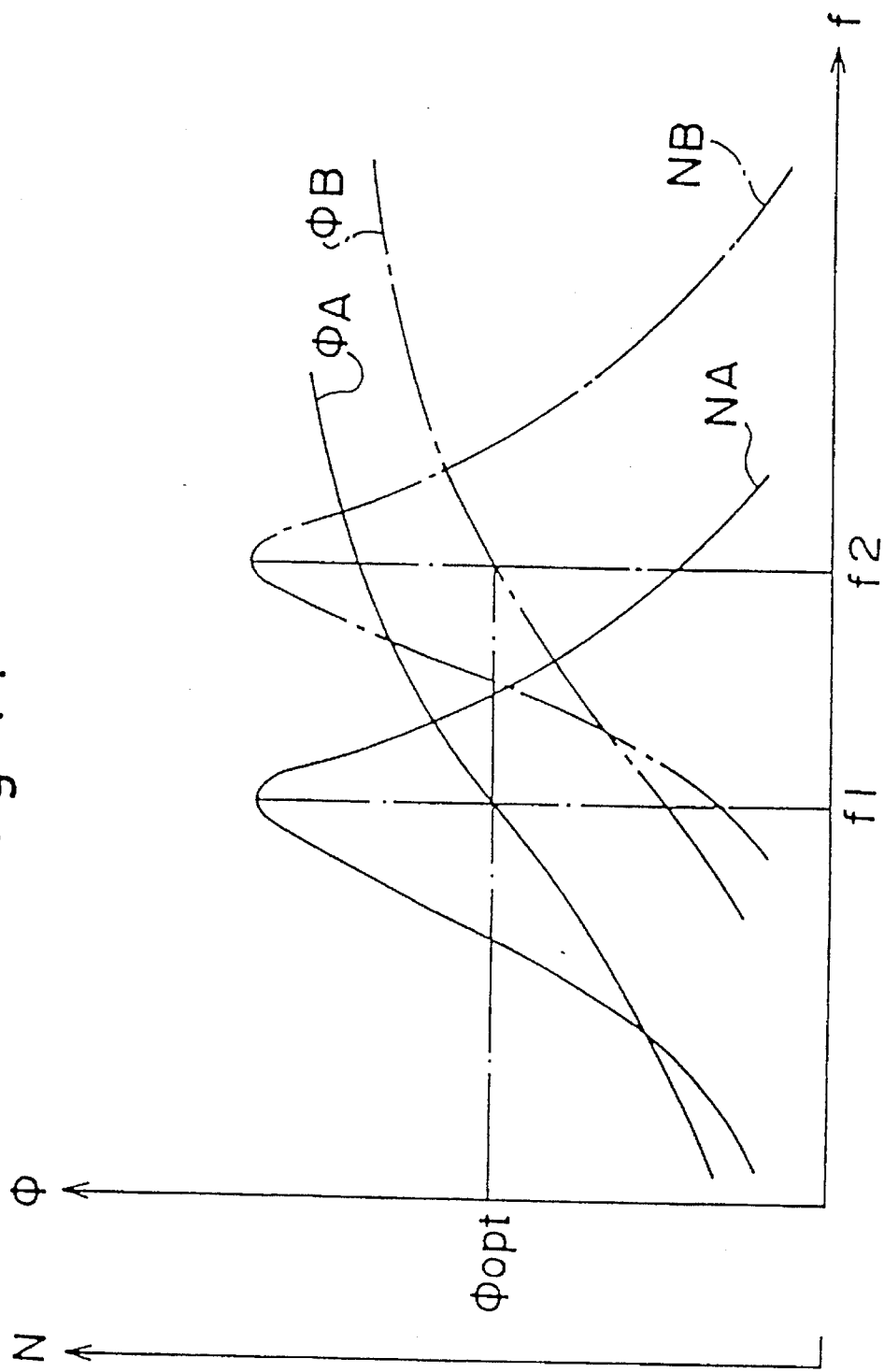
FIG. 17 is a figure showing, together, the way in which the drive speed N of the ultrasonic motor varies with respect to the drive frequency f, and the way in which the phase difference Φ between the detector voltage and the drive voltage varies with respect to the drive frequency f.
Figure 18:
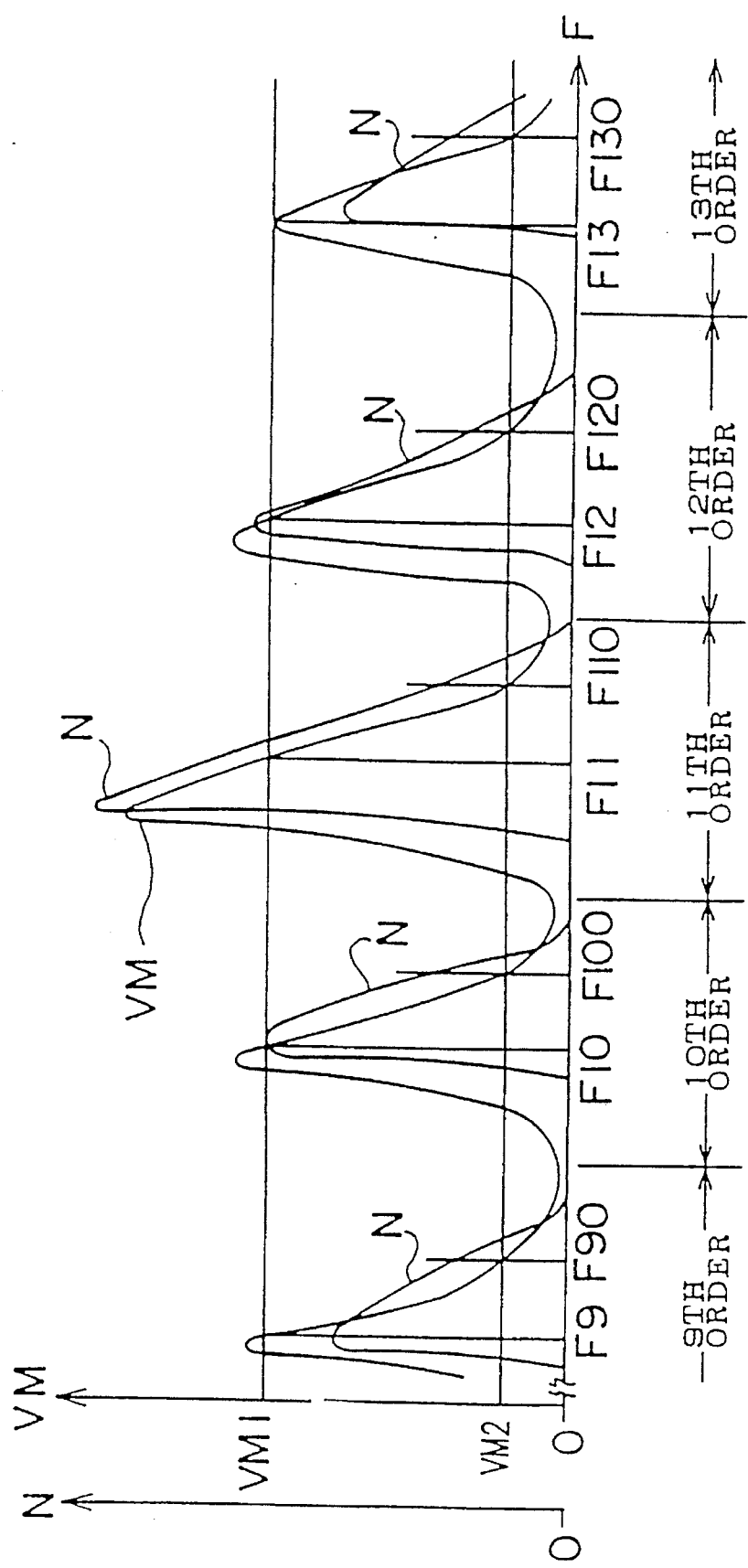
FIG. 18 is a figure showing, together, the way in which the drive speed N of the ultrasonic motor varies with respect to the drive frequency F, and the way in which the detector voltage VM varies with respect to the drive frequency F.

With the ultrasonic motor which uses the piezoelectric transducer element 12b shown in FIG. 15, the number of progressive oscillation waves of the stator 12 for the most appropriate resonance frequency band is 11 waves. Further, with the twelfth order resonance frequency band which is on the high frequency side relative to this eleventh order resonance frequency band, the number of progressive oscillation waves of the stator 12 is twelve waves, while with the thirteenth order resonance frequency band this number is thirteen waves. Further, in the same manner, each time the resonance band order number increases, the number of waves increases by one. On the other hand, with the tenth order resonance frequency band which is on the low frequency side relative to the eleventh order resonance frequency band, the number of progressive oscillation waves of the stator 12 is ten waves, while that of the ninth order resonance frequency band is nine waves. Further, in the same manner, each time the resonance band order number decreases, the number of waves decreases by one.

Figure 1:
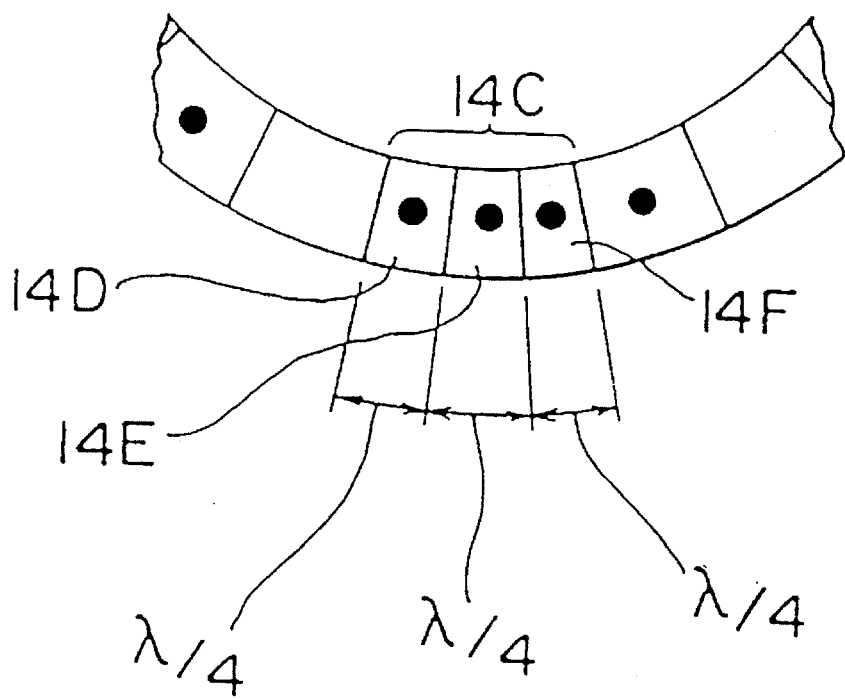
FIG. 1 is a figure showing an example of how a common electrode on a piezoelectric transducer element can be divided up so as to provide a plurality of detector electrodes.

With the first preferred embodiment of the present invention, as shown in FIG. 15, a second detector electrode is provided as a common electrode 14C in a position opposing a detector electrode 14M of the piezoelectric transducer element 12b, and this common electrode 14C has circumferential extent of $3*\lambda/4$. FIG. 1 shows an example in which this common electrode 14C is divided into several electrode portions. Here the common electrode 14C is divided into three equal electrode portions designated as 14D, 14E, and 14F, each of which has circumferential extent of $\lambda/4$, and all of these are of positive polarity although they are electrically separate electrode portions.

Figure 2:
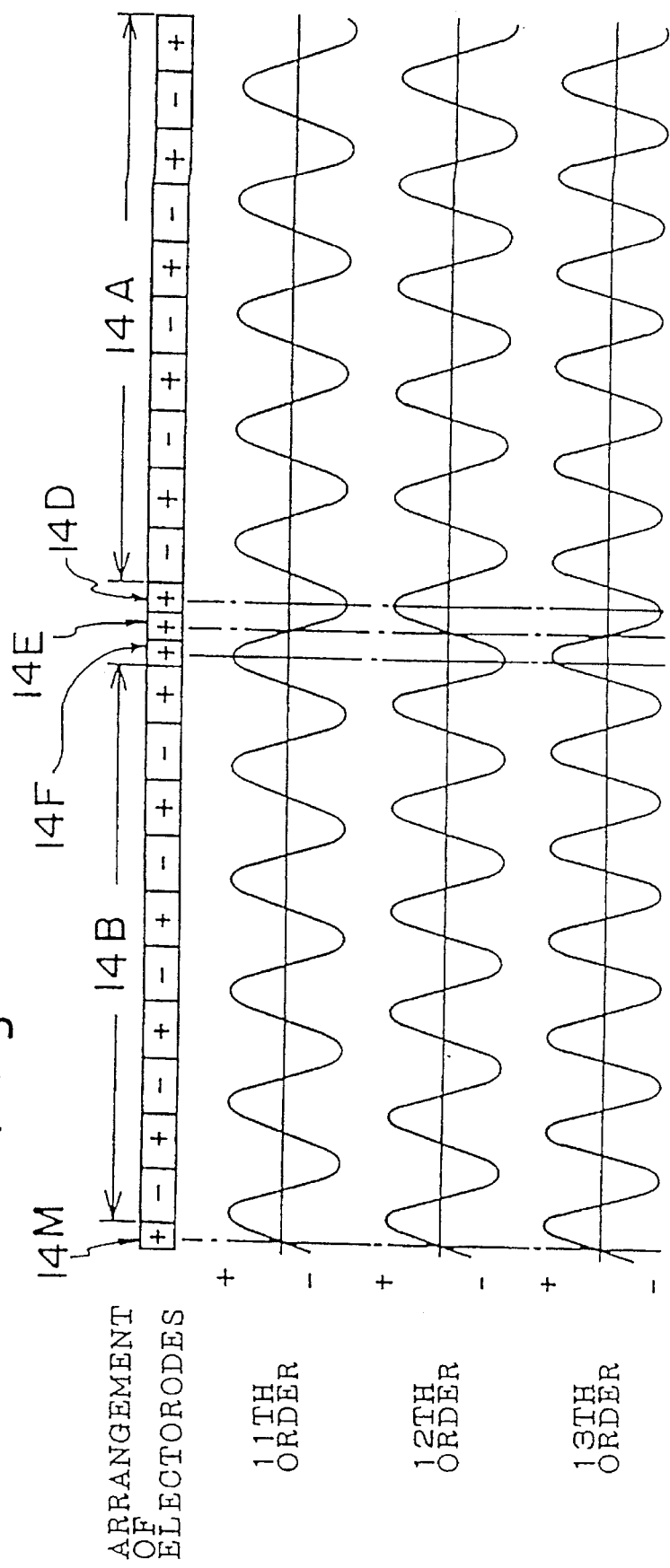
FIG. 2 is a figure showing the relationship between an exemplary arrangement of the electrodes of a piezoelectric transducer element (shown along a straight line) and progressive oscillations of the 11th, 12th, and 13th order resonance frequency bands.

In FIG. 2, the piezoelectric transducer element 12b of FIG. 1 (or, mutatis mutandis, the piezoelectric transducer element 12b of FIG. 15) is shown as extended along a straight line (although in actual fact of course it is circular), and the progressive oscillations on the stator 12 obtained with the eleventh, twelfth, and thirteenth resonance frequency bands are shown. Moreover, the progressive oscillations are shown as starting from the position of the detector electrode 14M as standard. As previously mentioned, the detector electrodes 14M, 14D, 14E, and 14F are all of circumferential extent $\lambda/4$, and, as seen from the center of the rotor 11, the angles between these four detector electrodes are determined according to the electrode dispositions shown in FIGS. 1 (or 15, mutatis mutandis).

As is clear from FIG. 2, when the number of progressive oscillation waves on the stator 12 changes, i.e. when the resonance band order number changes, the number of waves between the electrodes alters. The detector electrode 14C is divided into several detector electrode portions 14D, 14E, and 14F all of positive polarity, and, supposing that the voltage which is output from any one of these detector electrodes is of positive polarity when the progressive oscillation waves on the stator are proceeding in the positive (clockwise) direction as seen in the figure, then it will be clear that when the resonance frequency band changes the relative phase (or phase difference) between the output voltage waveforms from the various detector electrodes changes. For example, in the case of the detector electrodes 14M and 14E, the phase difference between the output voltage waveforms for the eleventh order resonance frequency band is 180 degrees, for the twelfth order resonance frequency band is 0 degrees, and for the thirteenth order resonance frequency band is again 180 degrees. In this case, as seen from the center of the rotor 11 the angle between the detector electrodes 14M and 14E is 180 degrees, and the phase difference between the output voltage waveforms from these two detector electrodes is determined according to what progressive oscillation waves are present between these two electrodes 14M and 14E. This relationship can be expressed in the form of equations in the manner which will now be explained.

If the angle between any two of the detector electrodes as seen from the center of the rotor 11 be termed θ, the number of waves of progressive oscillations generated on the stator 12 be termed n, and the number of waves of progressive oscillations between these two detector electrodes be termed n1, then n1 is given by:

$$n1 = (\theta * n)/360 \quad (1)$$

Here, the phase difference Φ between the output voltage waveforms from the two detector electrodes is the value obtained by multiplying the portion after the decimal point of the number of waves n1 as determined from equation (1) by 360 degrees. I.e., if this fractional portion of n1 be termed n2, then Φ is given by:

$$\Phi = 360 * n2 \quad (2)$$

In this manner, if the phase difference between the output voltage waveforms from at least two detector electrodes provided in any positions on the piezoelectric transducer element is detected, it is possible to determine, at least within some range, in what order resonance frequency band the drive frequency for the ultrasonic motor lies.

If the electrodes 14M and 14E are used as detector electrodes, since the angle between these detector electrodes as seen from the center of the rotor 11 is 180 degrees, i.e. because said pair of detector electrodes 14M and 14E are directly opposed to one another, therefore as the resonance band order number changes, the phase difference between the output voltage waveforms from these detector electrodes changes, and more specifically alternates between 0 degrees and 180 degrees as said resonance band order number progressively increments or decrements. Accordingly, for example, it is not possible to discriminate between the tenth order resonance frequency band and the twelfth order resonance frequency band since the phase difference between the output voltage waveforms from the detector electrodes is 0 degrees in both cases, and similarly it is not possible to discriminate between the eleventh order resonance frequency band and the thirteenth order resonance frequency band since the phase difference between the output voltage waveforms from the detector electrodes is 180 degrees in both cases. However, if the frequency band set by the drive frequency setting circuit or generated by the drive frequency oscillator is limited to being only either the eleventh order resonance frequency band or the twelfth order resonance frequency band, then the drive frequency is thereby limited to lying either in said eleventh order resonance frequency band or in said twelfth order resonance frequency band, and accordingly, if the phase difference between the output voltage waveforms from the detector electrodes is 0 degrees, it is possible to determine that the drive frequency definitely is set to a frequency which lies in the twelfth order resonance frequency band, while, on the other hand, if the phase difference between the output voltage waveforms from the detector electrodes is 180 degrees, it is possible to determine that the drive frequency definitely is set to a frequency which lies in the eleventh order resonance frequency band which is the most suitable frequency band for operation of the ultrasonic motor.

By contrast, referring now specifically to FIG. 15, if it is determined in what order resonance frequency band the drive frequency for the ultrasonic motor lies based upon the phase difference between the output voltage waveform from the detector electrode 14D or 14F and the output voltage waveform from the detector electrode 14M, then, since the angle between either of these pairs of detector electrodes as seen from the center of the rotor 11 is not 180 degrees, no problem of ambiguity arises as was the case with the above described directly opposing pair of electrodes such as the pair 14M and 14E, and it is possible to determine over a much wider range of frequency bands in what order frequency band the drive frequency for the ultrasonic motor lies.

Further, to consider the phase difference between the output voltage waveforms from detector electrodes which are disposed, like the detector electrodes 14D, 14E, and 14F, within a span of one wavelength of the progressive wave of the most suitable resonance frequency band: this phase difference diminishes each time the wave number of the progressive wave on the stator transits to a lower order resonance frequency band, while on the other hand said phase difference increases each time the wave number of the progressive wave on the stator transits to a higher order resonance frequency band, up to twice the normal wave number. Accordingly, when the phase difference between the output voltage signals from the detector electrodes is referred to the phase difference of the most suitable resonance frequency band, this phase difference varies almost linearly with the order of the resonance frequency band. Therefore it is very easy to determine whether the drive frequency for the ultrasonic motor currently is a frequency which lies within the most suitable resonance frequency band, or whether it currently is a frequency which lies within some other resonance frequency band.

It is desirable to determine the disposition of the detector electrodes for detecting in which order of resonance frequency band the drive frequency for the ultrasonic motor currently is lying according to the progressive vibration wave number, according to the angle between the detector electrodes as seen from the center of the rotor, and according to in which orders of resonance frequency band said frequency has so far been detected as lying, taking the most suitable resonance frequency band as a center.

Figure 3:
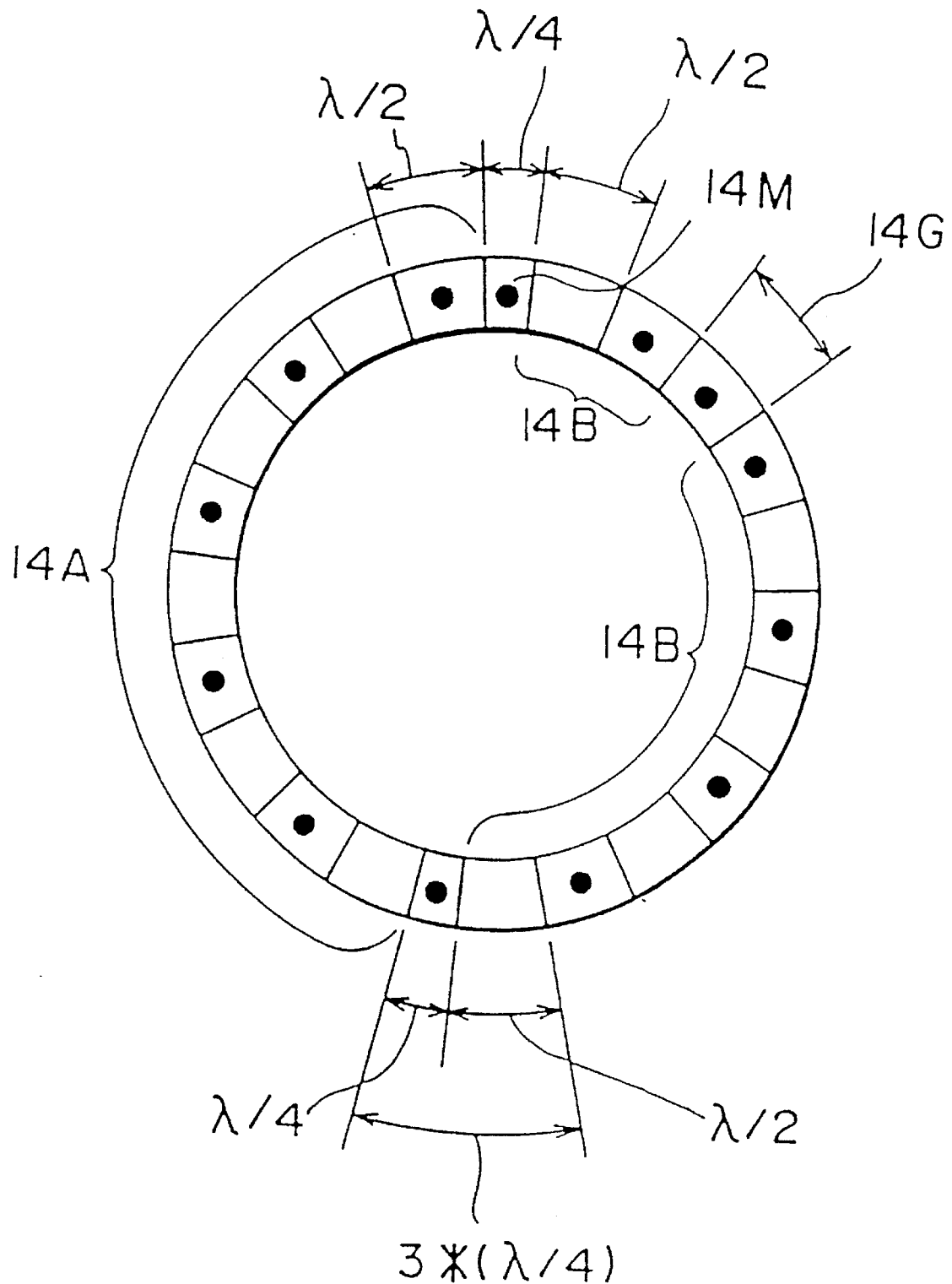
FIG. 3 is a figure showing another example of arrangement of the electrodes of a piezoelectric transducer element.

Furthermore, as shown in FIG. 3, if the detector electrode 14C is divided into two detector electrode portions one of circumferential extent λ/2 and the other of circumferential extent λ/4, and one electrode of the electrode group 14B and the electrode portion of circumferential extent λ/2 of the detector electrode 14C are interchanged, and the detector electrode 14C is used as the input electrode, then it is also acceptable to use an electrode 14G inserted between two intermediate members of the electrode group 14B as a detector electrode.

With the above method for detecting the order of the resonance frequency band in which the frequency of the driving voltage which is supplied to the ultrasonic motor is included, in the condition in which a progressive wave is generated on the stator the phase difference between the output voltage waveforms from two detector electrodes is determined, and it is determined in which order of resonance frequency band the drive frequency for the ultrasonic motor lies, but it is possible to detect the order of resonance frequency band in the same manner even in the condition in which a standing wave is being generated on the stator. I.e., a standing wave is generated on the stator if the drive voltage is supplied to either one (only) of the two input electrode groups. In this case, if the drive frequency is identical for the wave number of this standing wave and for the wave number of the progressive wave, then the wave number is also identical, and so it is possible to detect in which resonance frequency band the drive frequency for the ultrasonic motor lies in an identical manner as when performing this detection process for a progressive wave.

In this manner, by detecting the phase difference between the output voltage waveforms from two detector electrodes which are provided on the piezoelectric transducer element, it is possible to detect the order of the resonance frequency band, and, by controlling a drive frequency setting circuit or a drive frequency oscillator so as to bring the drive frequency for the ultrasonic motor within the most suitable resonance frequency band, even if during operation of the ultrasonic motor its operating temperature or the load which it is driving should change, it is positively prevented that the drive frequency for the ultrasonic motor should wander out of said resonance frequency band which is previously determined as the most suitable resonance frequency band for driving the ultrasonic motor, and therefore it is possible to drive the ultrasonic motor stably without wandering or fluctuation of its rotation speed.

Figure 4:
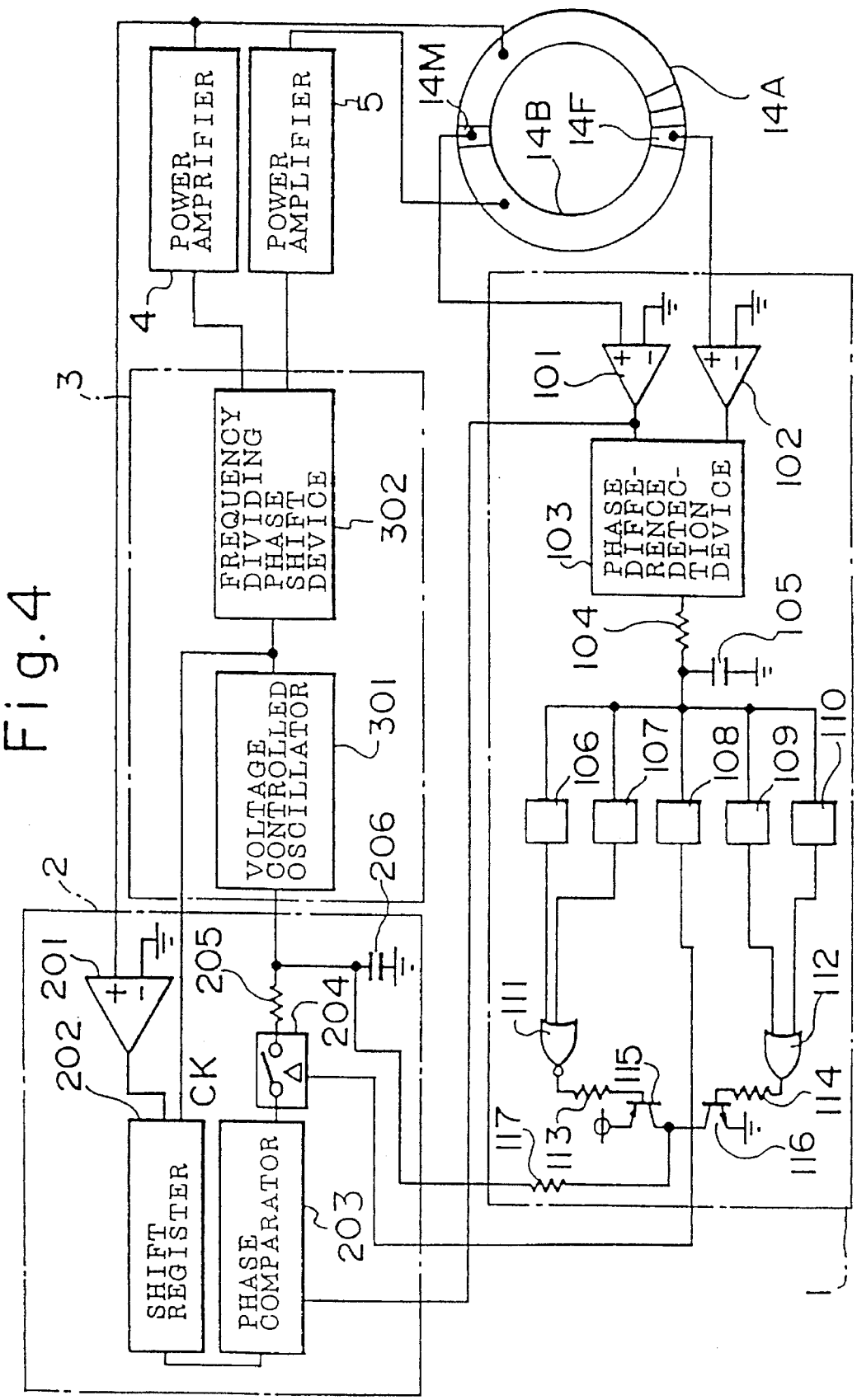
FIG. 4 is a block diagram showing the structure of the first preferred embodiment of the ultrasonic motor drive control device of the present invention.

FIG. 4 is a block diagram showing the structure of the first preferred embodiment of the drive control device for an ultrasonic motor of the present invention. In this first preferred embodiment, the drive control device, which controls the drive frequency based upon the phase difference between the waveform of the detector electrode output voltage and the drive voltage supplied to the input electrode group, will be explained by way of an example. Further, the piezoelectric transducer elements of the ultrasonic motor of this first preferred embodiment are disposed as shown in FIG. 15, and its common electrode 14c is divided up into three electrode portions 14D, 14E, and 14F as shown in FIG. 1, and the one 14F of these electrodes is used as a detector electrode. Accordingly, the most suitable resonance frequency band for this first preferred embodiment is the eleventh order frequency band.

The drive control device for the ultrasonic motor of this first preferred embodiment comprises a resonant wave order detection circuit 1, a drive frequency setting circuit 2, and an oscillation generating phase shift circuit 3 and two power amplifiers 4 and 5.

The resonant wave order detection circuit 1, based upon the phase difference between the output voltage waveforms from the two detector electrodes 14M and 14F, detects in which resonance frequency band the drive frequency of this ultrasonic motor is included. These two detector electrodes 14M and 14F of the ultrasonic motor are connected, respectively, to waveform shaping devices 101 and 102 included in the resonant wave order detection circuit 1. The output voltage waveforms from the two detector electrodes 14M and 14F are thus waveform shaped into square waves by these waveform shaping devices 101 and 102, respectively, and these square waves are output to a phase difference detection device 103.

Figure 5:
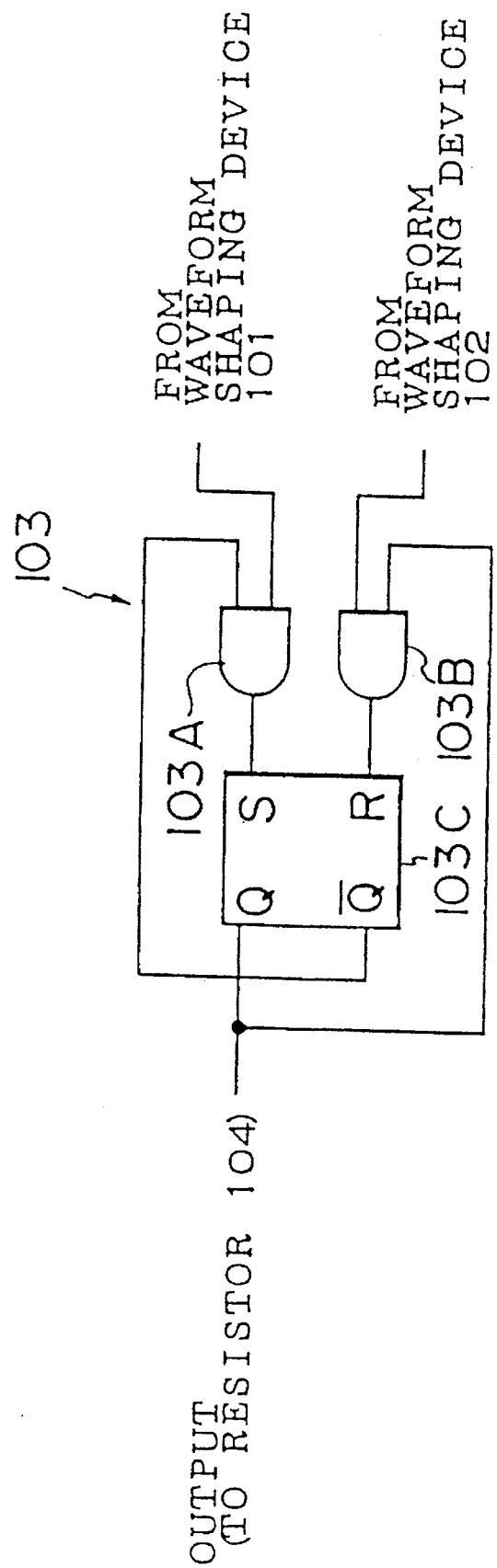
FIG. 5 is a block diagram showing the detailed structure of a phase difference detection device included in the FIG. 4 structure.

As shown in detail in FIG. 5, this phase difference detection device 103 comprises two AND gates 103A and 103B and a RS flip flop 103C, and it detects the difference between the phases of the output voltage waveforms from the two detector electrodes 14M and 14F. The output of the waveform shaping device 101 is connected to one of the inputs of the AND gate 103A, and the output of the other waveform shaping device 102 is connected to one of the inputs of the other AND gate 103B. And the other inputs of said AND gates 103A and 103B are connected to the outputs of the RS flip flop 103C.

Figure 6:
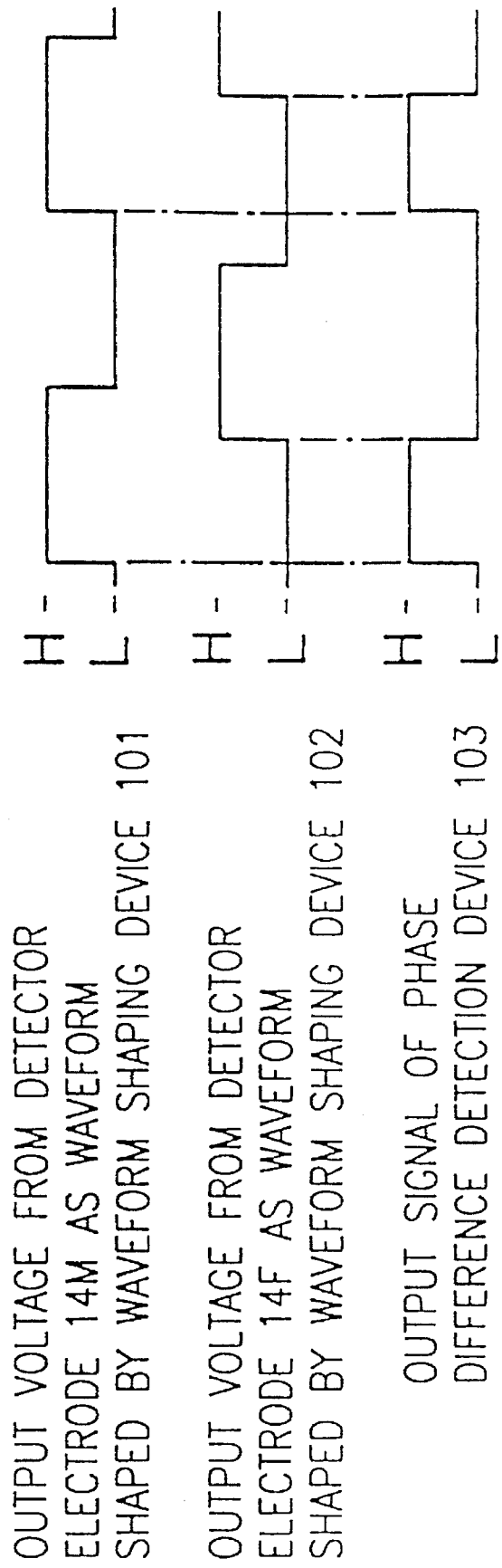
FIG. 6 is a time chart showing the input and output characteristics of the phase difference detection device shown in FIG. 5.

FIG. 6 is a time chart showing the input and output characteristics of the operation of the phase difference detection device 103 shown in FIG. 5. Alternately, the output voltage goes from low level to high level simultaneously with the rising edge of the output voltage signal from the detector electrode 14M which is input via the waveform shaping device 101, and the output voltage goes from high level to low level simultaneously with the rising edge of the output voltage signal from the other detector electrode 14F which is input via the other waveform shaping device 102. In other words, this phase difference detection device 103 outputs an output signal whose duty ratio depends upon the phase difference between the output voltage waveforms of the two detector electrodes 14M and 14F.

Figure 7:
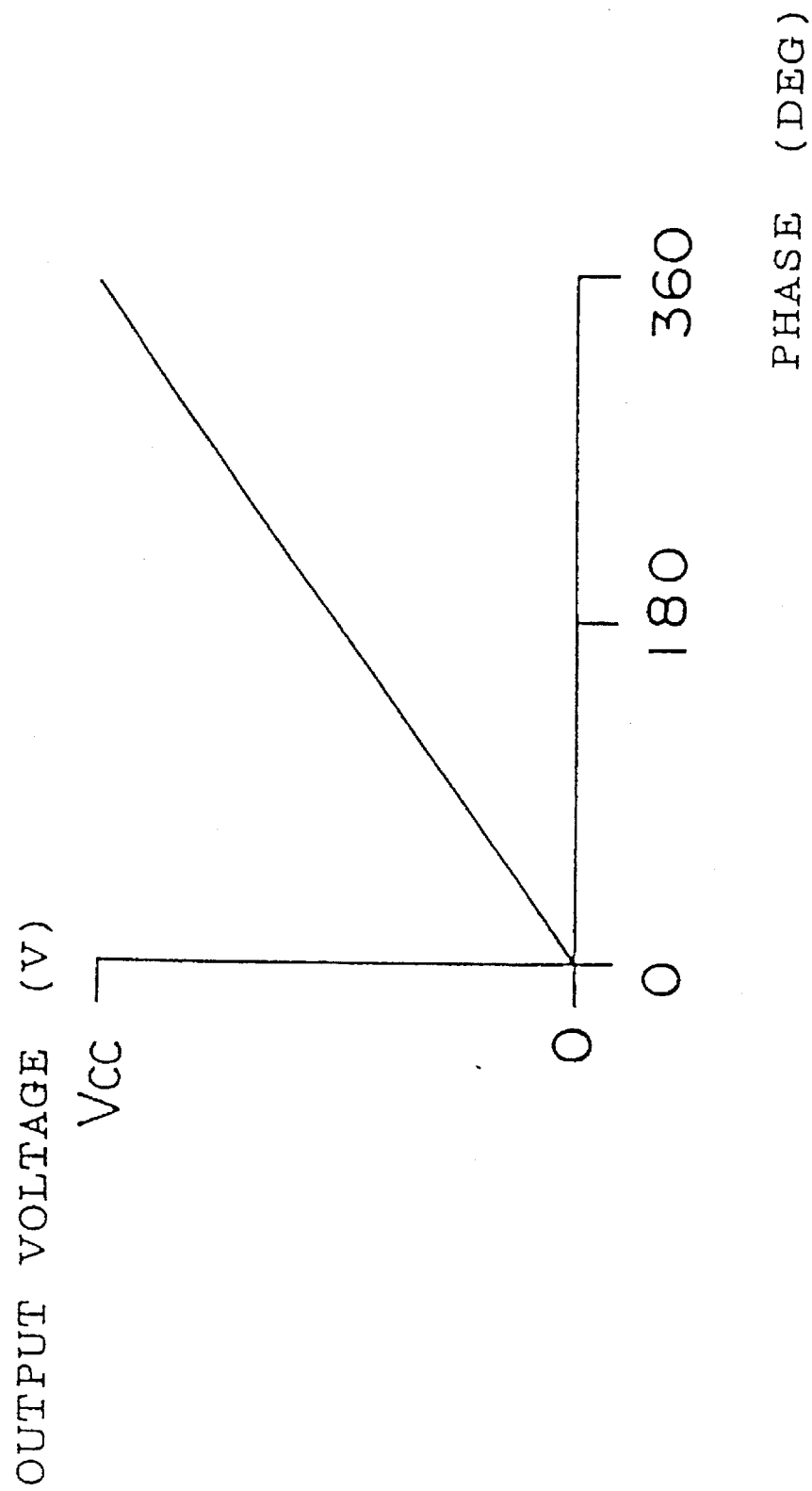
FIG. 7 is a figure showing the relationship between the phase difference between the output voltages from the detector electrodes and the output voltage of the phase difference detection device shown in FIG. 5.
Figure 8:
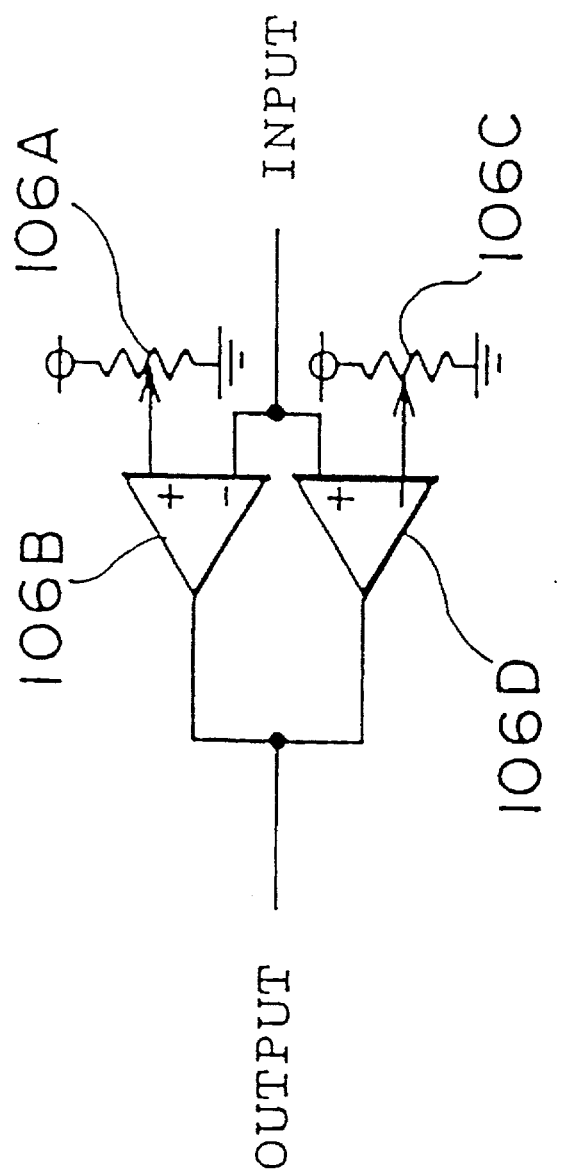
FIG. 8 is a block diagram showing the detailed structure of an exemplary one of five window comparators included in the FIG. 4 structure.

The output of the phase difference detection device 103 is connected to one terminal of a capacitor 105 via a resistor 104. The capacitor 105, the other terminal of which is connected to ground, smooths the output signal of the phase difference detection device 103 and converts it into a DC voltage signal. When the phase difference between the output voltage waveforms of the two detector electrodes 14M and 14F is relatively small, as shown in FIG. 6 the duty ratio of the output signal from the phase difference detection device 103 is relatively small, and the value of the smoothed DC voltage signal produced therefrom by the capacitor 105 is accordingly relatively low. On the other hand, when the phase difference between the output voltage waveforms of the two detector electrodes 14M and 14F is relatively great, the duty ratio of the output signal from the phase difference detection device 103 is relatively great, and the value of the smoothed DC voltage signal produced therefrom by the capacitor 105 is accordingly relatively high. The relationship between the phase difference (expressed in degrees) between the output voltage waveforms of the two detector electrodes 14M and 14F and the value in volts of the smoothed DC voltage signal Vcc produced therefrom by the capacitor 105 is shown in FIG. 7.

The non ground terminal of the capacitor 105 is further connected to the input terminals of five window comparators 106 through 110, and the voltage at this terminal of the capacitor 105, in other words the smoothed DC voltage signal produced by the capacitor 105 as described above, is supplied to these five window comparators 106 through 110. The structure of an exemplary one 106 of these five window comparators 106 through 110 is shown in block diagram form in FIG. 8; the other four window comparators 107 through 110 may have the identical structure. This window comparator 106 comprises two variable resistors 106A and 106C and two comparators 106B and 106D connected together as shown in the figure. As will readily be understood by one of ordinary skill in the art without further detailed explanation, the output signal of this window comparator 106 is high level when the voltage value of the voltage signal input to it is between the two voltage values set according to the adjustment of the two variable resistors 106A and 106C, while its said output signal is low level when the voltage value of the voltage signal input to it is not between said two voltage values set according to the adjustment of said two variable resistors 106A and 106C. The five window comparators 106 through 110 are comparators for detecting when the phase difference between the output voltage waveforms from the two detector electrodes 14M and 14F corresponds to, respectively, the ninth, tenth, eleventh, twelfth, and thirteen order resonance frequency bands. Accordingly the variable resistors 106A and 106C of each of these five window comparators 106 through 110 are set to appropriate fixed voltages for their comparators to detect respective input voltage value windows corresponding to the phase differences between the output voltage waveforms from the two detector electrodes 14M and 14F which correspond to said ninth, tenth, eleventh, twelfth, and thirteen order resonance frequency bands, respectively.

The phase difference between the output voltage waveforms from the two detector electrodes 14M and 14F which is to be detected by each of the five window comparators 106 through 110 is derived by using the two equations (1) and (2) given previously, and is, in this first preferred embodiment of the present invention: for the window comparator 106 for the ninth frequency band, about 106 degrees; for the window comparator 107 for the tenth frequency band, about 278 degrees; for the window comparator 108 for the eleventh frequency band, about 90 degrees; for the window comparator 109 for the twelfth frequency band, about 262 degrees; and, for the window comparator 110 for the thirteenth frequency band, about 74 degrees. In more detail, for each of these window comparators, the upper and lower limit values for the phase difference in response to which it is to provide high level output are determined as being about two or three degrees higher and lower than the ideal phase difference value given above for said comparator, so that a range of detection of appropriate width is specified, and then the settings of the variable resistors 106A and 106C of this window comparator are adjusted so as to provide reference DC voltage values corresponding to these higher and lower limit values respectively. For example, for the window comparator 106 for the ninth frequency band shown in FIG. 8 for which the ideal detection phase difference value is about 106 degrees, the upper and lower limit values for the phase difference are set to be about 109 degrees and about 103 degrees respectively, and then the variable resistor 106A of this window comparator 106 is set to a position at which it produces an output reference DC voltage value corresponding to this upper limit value of 109 degrees, while the variable resistor 106C is set to a position at which it produces an output reference DC voltage value corresponding to this lower limit value of 103 degrees. Similarly, the variable resistors 106A and 106C of the other four window comparators 107 through 110 are set to positions which provide output reference DC voltage values determined in the same manner (by being two or three degrees higher and lower respectively) with respect to the ideal detection phase difference values for these four window comparators 107 through 110 (278 degrees, 90 degrees, 262 degrees, and 74 degrees respectively).

Further, the phase difference between the output voltage waveforms from the two detector electrodes 14M and 14F changes in stepwise fashion with the boundary frequencies of the resonance frequency bands. Accordingly, it is necessary to determine the phase difference ranges of detection of the five window comparators 106 through 110 by taking into account phase errors in the arrangement of the electrodes on the piezoelectric transducer element 12b, while on the other hand allowing sufficient margin for each of them not to overlap the phase differences of the other resonance frequency bands.

Referring again to FIG. 4: the outputs of the window comparators 106 and 107 for the ninth and tenth frequency bands are connected to the inputs of a NOR gate 111; the output of the window comparator 108 for the eleventh frequency band is connected to the control terminal of a relay 204; and the outputs of the window comparators 109 and 110 for the twelfth and thirteenth frequency bands are connected to the inputs of an OR gate 112. The output of the NOR gate 111 is connected via a resistor 113 to the base of a transistor 115, and similarly the output of the OR gate 112 is connected via another resistor 114 to the base of another transistor 116. And the collectors of the two transistors 115 and 116 are connected together, and are then connected via a resistor 117 to a capacitor 206 incorporated in the drive frequency setting circuit 2, the other terminal of which is connected to ground. Further, the emitter of the transistor 115 is connected to the power line, while the emitter of the other transistor 116 is connected to ground.

Now, to consider the window comparators 106 and 107 which correspond to the ninth and tenth order resonance frequency bands which are those which are lower than the most suitable one (the eleventh) of the resonance frequency bands for the drive frequency, if from the state in which both of their outputs are low level either one (of course not both) of their said outputs goes to high level, then the output of the NOR gate 111 changes from high level to low level. As a result, a low level signal is supplied to the base of the transistor 115 via the resistor 113, so that said transistor 115 is put into the conducting state. At this time, since the output signals of the window comparators 109 and 110 which correspond to the twelfth and thirteenth order resonance frequency bands are both of course low level, therefore the output of the OR gate 112 is also low level, and accordingly as a result a low level signal is supplied to the base of the transistor 116 via the resistor 114, so that said transistor 116 is put into the non-conducting state. Thereby at this time the power source voltage is transmitted via the transistor 115 and the resistor 117 to the capacitor 206.

On the other hand, to consider the window comparators 109 and 110 which correspond to the twelfth and thirteen order resonance frequency bands which are those which are higher than the most suitable one (the eleventh) of the resonance frequency bands for the drive frequency, if from the state in which both of their outputs are low level either one (of course not both) of their said outputs goes to high level, then the output of the OR gate 112 changes from low level to high level. As a result, a high level signal is supplied to the base of the transistor 116 via the resistor 114, so that said transistor 116 is put into the conducting state. At this time, since the output signals of the window comparators 106 and 107 which correspond to the ninth and tenth order resonance frequency bands are both of course low level, therefore the output of the NOR gate 111 is high level, and accordingly as a result a high level signal is supplied to the base of the transistor 115 via the resistor 113, so that said transistor 115 is put into the non-conducting state. Thereby at this time the capacitor 206 is connected via the resistor 117 and the transistor 116 to ground.

Further, when the drive frequency is within the eleventh order resonance frequency band which is the most suitable one of the resonance frequency bands for said drive frequency, only the output of the window comparator 108 is high level, while the outputs of the other four window comparators 106, 107, 109, and 110 are low level. This high level signal is transmitted directly to the control terminal of the relay 204 of the drive frequency setting circuit 2. At this time, the output of the NOR gate 111 is high level, while the output of the OR gate 112 is low level. As a result, both of the transistors 115 and 116 are put into the non-conducting state. Thereby at this time the resistor 117 and the non-ground terminal of the capacitor 206 are not connected to anything, and remain in the isolated state.

The drive frequency setting circuit 2 comprises a waveform shaping device 201, a shift register 202, a phase comparator 203, the previously mentioned relay 204, a resistor 205, and the previously mentioned capacitor 206, and sets the drive frequency for this ultrasonic motor to the frequency of the eleventh order resonance frequency band, which is the most suitable one of the resonance frequency bands.

The input of the waveform shaping device 201 is connected to the one input electrode group 14A of this ultrasonic motor, and said waveform shaping device 201 waveform shapes the drive voltage waveform which is supplied to said input electrode group 14A into a square wave, which it outputs to the shift register 202. The output of the previously described voltage controlled oscillator 301 is connected to the clock terminal CK of the shift register 202, and thereby inputs a pulse signal of a predetermined frequency to said clock terminal CK. The shift register 202 counts the clock pulses thus input to its clock terminal CK, and delays the drive voltage waveform which it inputs from the waveform shaping device 201 by a time period which is defined by a previously determined number of said clock pulses.

The phase comparator 203 receives as input this waveform shaped and delayed drive voltage waveform from the shift register 202 and also receives as input the output voltage waveform from the detector electrode 14M after it has been waveform shaped by the waveform shaping device 101, compares these two input waveforms, and outputs a DC voltage signal according to the phase difference between them. The relay 204 is controlled by the output signal from the previously described window comparator 108 of the resonant wave order detection circuit 1, and is caused to go closed circuit when said output signal from said window comparator 108 is high level, while it goes open circuit when said output signal from said window comparator 108 is low level. Therefore, when the drive frequency is within the eleventh order resonance frequency band which is the most suitable one of the resonance frequency bands, the relay 204 is closed, whereby the output voltage from the phase comparator 203 is supplied via the resistor 205 to the capacitor 206. On the other hand, when the drive frequency is not within said most suitable eleventh order resonance frequency band, the relay 204 is open, whereby the output voltage from the phase comparator 203 is isolated from the resistor 205 and from the capacitor 206.

Furthermore, if it is ensured that the value of the resistance of the resistor 205 is sufficiently greater than the value of the resistance of the resistor 117, then even if the window comparator 108 and the relay 204 are omitted no particular problem will occur.

The oscillation generating phase shift circuit 3 comprises the voltage controlled oscillator 301 and a frequency dividing phase shift device 302, and generates an AC output signal having the same frequency as the drive frequency set by the drive frequency setting circuit 2 but a phase difference of π/2 with respect thereto. The voltage controlled oscillator 301 generates an AC output signal having a frequency determined according to the DC voltage which it inputs from the drive frequency setting circuit 2, and outputs said AC output signal to the frequency dividing phase shift device 302 and to the shift register 202. The frequency dividing phase shift device 302 frequency divides this AC output signal which it receives from the voltage controlled oscillator 301 to the required frequency, and generates two AC output signals having a mutual phase difference of π/2, which it outputs to the power amplifiers 4 and 5.

The power amplifiers 4 and 5 amplify these AC output signals which they receive from the oscillation generating phase shift circuit 3 into drive voltage signals, and supply these drive voltage signals to the input electrode groups 14A and 14B. It should be understood that an inductor which in fact is connected between the input electrode groups 14A and 14B and the common electrode is not shown in FIG. 4 for the sake of simplicity. These power amplifiers 4 and 5 are controlled by a control circuit which is not shown in the figures, and when an actuating signal from this control circuit is provided to said power amplifiers 4 and 5 they supply drive voltages to the input electrode groups 14A and 14B, while when a stop signal from said control circuit is provided to said power amplifiers 4 and 5 they stop supplying drive voltages to said input electrode groups 14A and 14B.

With the above described drive control device, when the drive frequency is detected by the resonant wave order detection circuit 1 as being a frequency which lies within the eleventh order resonance frequency band, then the output of the window comparator 108 is high level, and accordingly the relay 204 is closed and simultaneously the resistor 117 is put into the isolated state, so that the drive frequency setting circuit 2, the oscillation generating phase shift circuit 3, the power amplifiers 4 and 5, and the ultrasonic motor at this time constitute a negative feedback control type phase locked loop, which controls so as to keep the drive frequency at the eleventh order resonance frequency band which is previously determined to be the most suitable one of the resonance frequency bands for said drive frequency. Now, this action will be explained.

Figure 19:
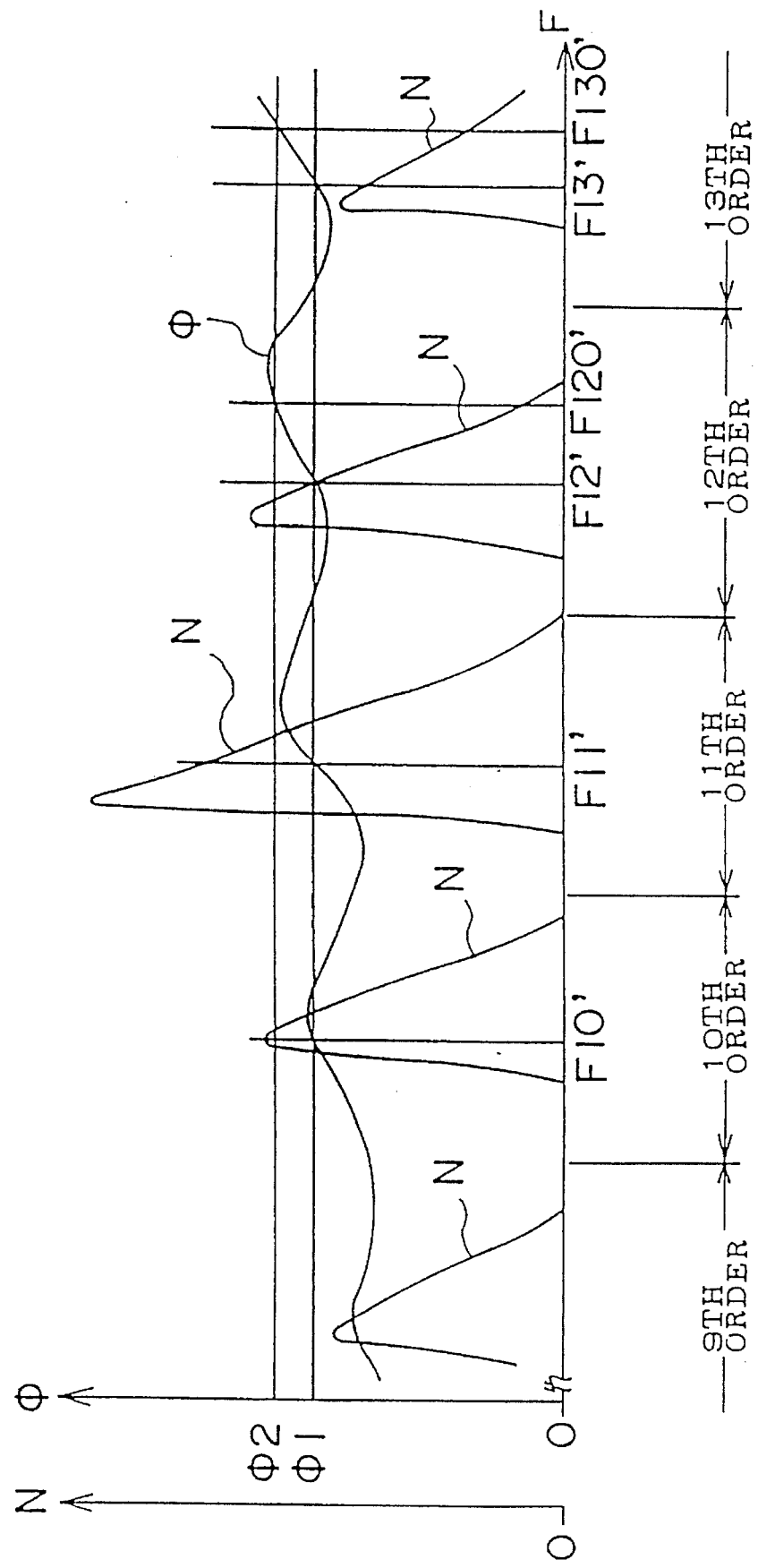
FIG. 19 is a figure showing, together, the way in which the drive speed N varies with respect to the drive frequency F, and the way in which the phase difference Φ between the detector voltage and the drive voltage varies with respect to the drive frequency F.

Supposing that the output frequency of the voltage controlled oscillator 301 is divided by a ratio 1/P by the frequency dividing phase shift device 302, then one cycle of the output signal of said voltage controlled oscillator 301 will correspond to 360 degrees/P of phase difference. Accordingly, if the exact number of clock pulses (Φ1/360 deg/P) which corresponds to the phase difference Φ1 shown in FIG. 19 is set in the shift register 202, then the output voltage waveform from the shift register 202 will be in phase with the output voltage waveform of the detector electrode 14M, and the drive frequency will be the frequency F11' as shown in FIG. 19.

If the drive frequency is less than F11', then, since the phase difference is less than Φ1, the output voltage waveform from the shift register 202 is delayed in phase as compared with the output voltage waveform of the detector electrode 14M, and therefore the output voltage of the phase comparator 203 will rise and the voltage at the non ground terminal of the capacitor 206 will rise. Due to this, the input voltage to the voltage controlled oscillator 301 will rise, and therefore the frequency of its output will rise. And, when this frequency arrives at F11', then the output voltage waveform from the shift register 202 will be in phase with the output voltage waveform of the detector electrode 14M, and therefore the output voltage of the phase comparator 203 will stop rising and become constant. As a result, the voltage at the non ground terminal of the capacitor 206 will also stop rising and become constant, so that the input voltage to the voltage controlled oscillator 301 will also stop rising and become constant, which means that the frequency of the output signal from said voltage controlled oscillator 301 will also stop rising and become constant. In other words, the drive frequency for the ultrasonic motor will reach and remain at the frequency F11' within the eleventh order resonance frequency band.

On the other hand, supposing that the drive frequency is greater than F11', then, since the phase difference is greater than fΦ1, the output voltage waveform from the shift register 202 is advanced in phase as compared with the output voltage waveform of the detector electrode 14M, and therefore the output voltage of the phase comparator 203 will drop and the voltage at the non ground terminal of the capacitor 206 will drop. Due to this, the input voltage to the voltage controlled oscillator 301 will drop, and therefore the frequency of its output will drop. And, when this frequency arrives at F11', then the output voltage waveform from the shift register 202 will be in phase with the output voltage waveform of the detector electrode 14M, and therefore the output voltage of the phase comparator 203 will stop dropping and become constant. As a result, the voltage at the non ground terminal of the capacitor 206 will also stop dropping and become constant, so that the input voltage to the voltage controlled oscillator 301 will also stop dropping and become constant, which means that the frequency of the output signal from said voltage controlled oscillator 301 will also stop dropping and become constant. In other words, the drive frequency for the ultrasonic motor will reach and remain at the frequency F11' within the eleventh order resonance frequency band.

If the drive frequency is detected by the resonant wave order detection circuit 1 as being a frequency which lies in some resonance frequency band other than the eleventh order resonance frequency band, then the output of the window comparator 108 is low level, and accordingly the relay 204 is open and therefore the phase comparator 203 and the resistor 205 are disconnected from one another. Further, either the transistor 115 or the transistor 116 controls, via the resistor 117, the voltage at the non ground terminal of the capacitor 206.

When the drive frequency is in fact detected by the resonant wave order detection circuit 1 as being a frequency which lies in a lower order resonance frequency band than the eleventh order resonance frequency band, i.e. in the ninth order resonance frequency band or in the tenth order resonance frequency band, then as described above the transistor 115 is in the conducting state, while the transistor 116 is in the non conducting state. Therefore, at this time, the power source voltage is transmitted via the transistor 115 and the resistor 117 to the capacitor 206, whereby said capacitor 206 is charged up and the voltage at its non ground terminal rises. By this, the input voltage to the voltage controlled oscillator 301 rises, so that the frequency of its output signal also rises. In other words, the drive frequency for the ultrasonic motor rises. When this drive frequency has risen so far as to lie within the eleventh order resonance frequency band, the transistor 115 goes into the non conducting state along with the transistor 116 which remains in the non conducting state, and thereby the charging up process for the capacitor 206 is terminated. At the same time, the output of the window comparator 208 goes high level and as a result the relay 204 is closed, so that the above described phase lock loop type of control commences and the drive frequency is controlled to be equal to the frequency F11' within the eleventh order resonance frequency band.

On the other hand, when the drive frequency is in fact detected by the resonant wave order detection circuit 1 as being a frequency which lies in a higher order resonance frequency band than the eleventh order resonance frequency band, i.e. in the twelfth order resonance frequency band or in the thirteenth order resonance frequency band, then as described above the transistor 115 is in the non conducting state, while the transistor 116 is in the conducting state. Therefore, at this time, the capacitor 206 is connected to ground via the transistor 116 and the resistor 117, whereby said capacitor 206 is discharged and the voltage at its non ground terminal drops. By this, the input voltage to the voltage controlled oscillator 301 drops, so that the frequency of its output signal also drops. In other words, the drive frequency for the ultrasonic motor drops. When this drive frequency has dropped so far as to lie within the eleventh order resonance frequency band, the transistor 116 goes into the non conducting state along with the transistor 115 which remains in the non conducting state, and thereby the discharging process for the capacitor 206 is terminated. At the same time, the output of the window comparator 208 goes high level and as a result the relay 204 is closed, so that the above described phase lock loop type of control commences and the drive frequency is controlled to be equal to the frequency F11' within the eleventh order resonance frequency band.

In this manner, according to the construction and function of this first preferred embodiment of the present invention, two detector electrodes are provided on the piezoelectric transducer element, and based upon the phase difference between the output voltage waveforms from these two detector electrodes it is detected in which order of resonance frequency band the drive frequency for the ultrasonic motor lies, and the drive frequency setting circuit 2 is controlled so as to bring the drive frequency within that resonance frequency band which is previously determined as being most suitable for driving the ultrasonic motor. Accordingly, even if during operation of the ultrasonic motor its operating temperature or the load which it is driving should change, it is positively prevented that the drive frequency for the ultrasonic motor should wander out of said resonance frequency band which is previously determined as the most suitable resonance frequency band for driving the ultrasonic motor, and therefore it is possible to drive the ultrasonic motor stably without wandering or fluctuation of its rotation speed.

Preferred Embodiment 2

The second preferred embodiment of the drive control device of the present invention for an ultrasonic motor will now be described in terms of the use of the electrodes 14E and 14F shown in FIG. 1 as detector electrodes. As described above, due to the detector electrodes 14E and 14F being disposed within a span of one wavelength of the progressive wave of the most suitable eleventh order resonance frequency band, thereby, when the drive frequency for the ultrasonic motor lies within a resonance frequency band which is of a lower order than the most suitable eleventh order resonance frequency band, then the phase difference between the output voltage waveforms from said detector electrodes 14E and 14F is less than in the case when said drive frequency lies within said most suitable eleventh order resonance frequency band; while, on the other hand, when said drive frequency for the ultrasonic motor lies within a resonance frequency band which is of a higher order than said most suitable eleventh order resonance frequency band, then the phase difference between the output voltage waveforms from said detector electrodes 14E and 14F is greater than in said case when said drive frequency lies within said most suitable eleventh order resonance frequency band. Due to this fact, taking the phase difference between the output voltage waveforms from said detector electrodes 14E and 14F when the drive frequency is within said most suitable eleventh order resonance frequency band as a reference phase difference, if the phase difference between the output voltage waveforms from said detector electrodes 14E and 14F is less than said reference phase difference, it is possible to conclude that the drive frequency for the ultrasonic motor lies within a resonance frequency band which is of a lower order than said most suitable eleventh order resonance frequency band; while, on the other hand, if the phase difference between the output voltage waveforms from said detector electrodes 14E and 14F is greater than said reference phase difference, it is possible to conclude that the drive frequency for the ultrasonic motor lies within a resonance frequency band which is of a higher order than said most suitable eleventh order resonance frequency band.

For example, since the angle θ subtended between the detector electrodes 14E and 14F is about 8.2 degrees, the phase differences between the output voltage waveforms from said detector electrodes 14E and 14F for the ninth through the thirteenth order resonance frequency bands can be calculated according to the above described equations (1) and (2) to be, respectively in order, about 74 degrees, about 82 degrees, 90 degrees, about 98 degrees, and about 106 degrees. Taking the phase difference for the most suitable eleventh order resonance frequency band as a reference phase difference, then, if the actual phase difference is lower than said reference phase difference, the drive frequency for the ultrasonic motor falls in a lower resonance frequency band than said eleventh order resonance frequency band; while, on the other hand, if the actual phase difference is higher than said reference phase difference, the drive frequency for the ultrasonic motor falls in a higher resonance frequency band than said eleventh order resonance frequency band. In fact, as can easily be seen from the actual phase differences as calculated above, the phase difference between the output voltage waveforms from the detector electrodes 14E and 14F varies almost linearly with the order of the resonance frequency band in which the drive frequency for the ultrasonic motor lies.

Figure 9:
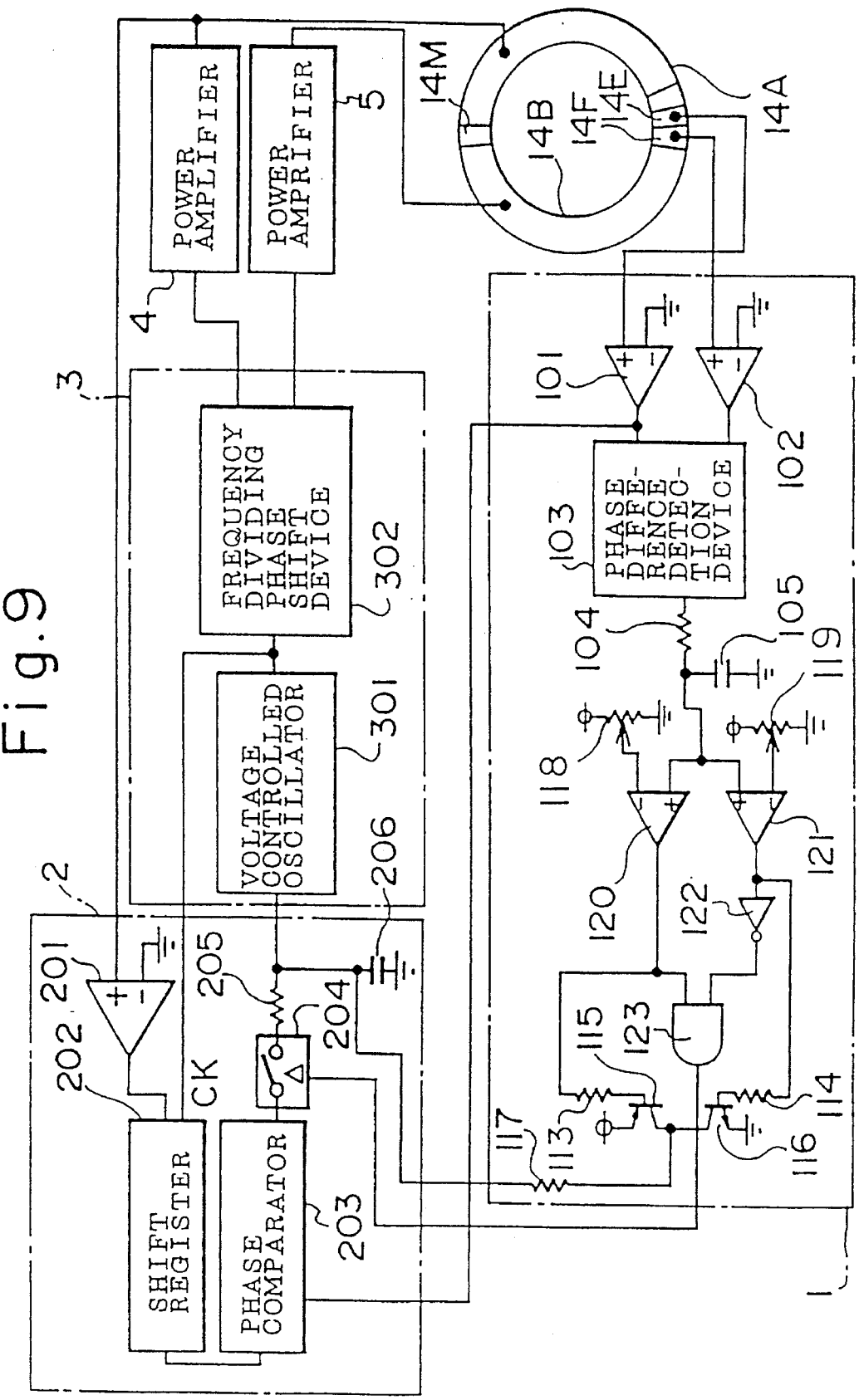
FIG. 9 is a block diagram showing the structure of the second preferred embodiment of the ultrasonic motor drive control device of the present invention.

FIG. 9 is a block diagram showing the structure of the second preferred embodiment of the ultrasonic motor drive control device of the present invention. In this figure, elements which correspond to elements in the first preferred embodiment of the present invention as shown in the FIG. 4 block diagram, and which have the same functions, are designated by the same reference symbols, and explanation thereof will be curtailed in the interests of brevity. The present description will therefore focus upon the points in which this second preferred embodiment differs from the first preferred embodiment, as already disclosed.

Figure 10:
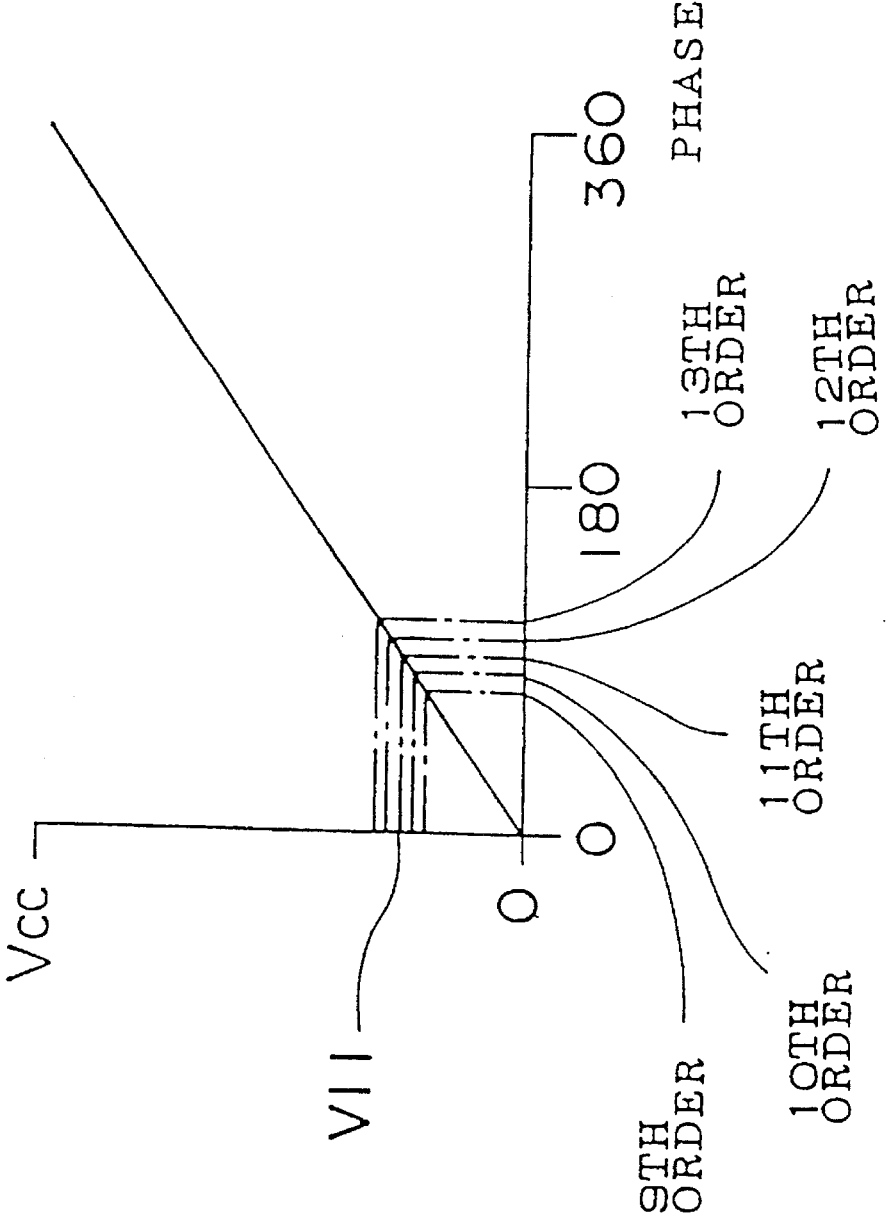
FIG. 10 is a figure showing the relationship during the operation of said second preferred embodiment between the phase difference between the output voltages from the detector electrodes and the voltage between the terminals of a capacitor 105 which is included in the FIG. 9 structure.

One terminal of a capacitor 105 is connected to ground, and to its other terminal a voltage Vcc is supplied from a phase difference detection device 103 of the type described earlier in this specification with reference to the first preferred embodiment of the present invention, said voltage Vcc varying according to the phase difference between the output voltage waveforms from the detector electrodes 14E and 14F as shown in FIG. 10. Taking as a reference voltage value the value V11 of Vcc when the phase difference between the output voltage waveforms from the detector electrodes 14E and 14F is 90 degrees, at which time the drive frequency for the ultrasonic motor falls within the most suitable eleventh order resonance frequency band, then the values of Vcc for the ninth and tenth resonance frequency bands which are of lower order than said most suitable eleventh order resonance frequency band are less than said reference voltage V11, while on the other hand the values of Vcc for the twelfth and thirteenth resonance frequency bands which are of higher order than said most suitable eleventh order resonance frequency band are greater than said reference voltage V11.

The non ground terminal of the capacitor 105 is connected to the positive terminals of two comparators 120 and 121. The negative terminal of the comparator 120 is connected to the intermediate terminal of a variable resistor 118, the end terminals of which are connected to the power source voltage and to ground, so that by adjustment of said variable resistor 118 any desire voltage can be supplied to said negative terminal of said comparator 120, and in fact said variable resistor 118 is so adjusted that the voltage thus supplied to said negative terminal of said comparator 120 is a little lower than V11, being a voltage corresponding to a phase difference between the output voltage waveforms from the detector electrodes 14E and 14F of about 87 or 88 degrees. Similarly, the negative terminal of the other comparator 121 is connected to the intermediate terminal of another variable resistor 119, the end terminals of which are connected to the power source voltage and to ground, so that by adjustment of said variable resistor 119 any desire voltage can be supplied to said negative terminal of said comparator 121, and in fact said variable resistor 119 is so adjusted that the voltage thus supplied to said negative terminal of said comparator 121 is a little higher than V11, being a voltage corresponding to a phase difference between the output voltage waveforms from the detector electrodes 14E and 14F of about 92 or 93 degrees. Accordingly, when the drive frequency for the ultrasonic motor falls within the most suitable eleventh order resonance frequency band, then the output voltage from the comparator 120 is high level, and the output voltage from the comparator 121 is low level. However, if the drive frequency for the ultrasonic motor drops so as no longer to lie in said most suitable eleventh order resonance frequency band, then the voltage Vcc at the non ground terminal of the capacitor 105 drops so as to be lower than the voltage which is being supplied from the variable resistor 118 according to its setting, and accordingly the output voltage from the comparator 120 becomes low level. On the other hand, if the drive frequency for the ultrasonic motor rises so as no longer to lie in said most suitable eleventh order resonance frequency band, then the voltage Vcc at the non ground terminal of the capacitor 105 rises so as to be higher than the voltage which is being supplied from the variable resistor 119 according to its setting, and accordingly the output voltage from the comparator 121 becomes high level.

The output voltage from the comparator 120 is supplied to one input terminal of an AND gate 123, and is also supplied via a resistor 113 to the base of a transistor 115. On the other hand, the output voltage from the comparator 121 is supplied to the other input terminal of said AND gate 123 via an inverter 122, and is also supplied via a resistor 114 to the base of another transistor 116.

Thus, when the drive frequency for the ultrasonic motor lies in said most suitable eleventh order resonance frequency band, then because the output voltage from the comparator 120 is high level the transistor 115 is in the non conducting state, and because the output voltage from the comparator 121 is low level the transistor 116 is in the non conducting state. Further, since both the inputs of the AND gate 123 are high level its output is high level, and accordingly the relay 204 is closed. To summarize the functioning of the shown resonant wave order detection circuit 1A, at this time it detects that the drive frequency for the ultrasonic motor currently lies in the most suitable eleventh order resonance frequency band, and it therefore closes the relay 204, so that the drive frequency setting circuit 2, the oscillation generating phase shift circuit 3, the power amplifiers 4 and 5, and the ultrasonic motor at this time constitute a negative feedback control type phase locked loop, which controls so as to keep the drive frequency within the eleventh order resonance frequency band which is previously determined to be the most suitable one of the resonance frequency bands for said drive frequency. This phase locked loop control will not be particularly explained here, because it is identical to the phase locked loop control of the first preferred embodiment which has been already explained.

However, if the drive frequency for the ultrasonic motor drops so as to lie in a resonance frequency band which is lower than said most suitable eleventh order resonance frequency band, then the output of the comparator 120 becomes low level, and since this one of the inputs of the AND gate 123 is low level its output is low level, and accordingly the relay 204 is opened. Further, at this time, this low level signal is supplied to the base of the transistor 115, and accordingly said transistor 115 is put into the conducting state, whereby line power is supplied via the resistor 117 to the non ground terminal of the capacitor 206. As a result, said capacitor 206 is charged up and the voltage at its non ground terminal rises, i.e. the input voltage to the voltage controlled oscillator 301 rises, so that the drive frequency for the ultrasonic motor also rises, just as was the case in the first preferred embodiment. And, when the drive frequency for the ultrasonic motor has risen so far as to lie in the most suitable eleventh order resonance frequency band, then the transistor 115 is put into the non conducting state and also the relay 204 is closed, so that the phase locked loop form of control as described above for said drive frequency is started and the drive frequency is kept within the eleventh order resonance frequency band.

On the other hand, if the drive frequency for the ultrasonic motor rises so as to lie in a resonance frequency band which is higher than said most suitable eleventh order resonance frequency band, then the output of the comparator 121 becomes high level so that the output of the inverter 122 becomes low level, and since this one of the inputs of the AND gate 123 is low level its output is low level, and accordingly the relay 204 is opened. Further, at this time, the high level signal is supplied to the base of the transistor 116, and accordingly said transistor 116 is put into the conducting state, whereby the non ground terminal of the capacitor 206 is connected to ground via the resistor 117. As a result, said capacitor 206 is discharged and the voltage at its non ground terminal drops, i.e. the input voltage to the voltage controlled oscillator 301 drops, so that the drive frequency for the ultrasonic motor also drops, just as was the case in the first preferred embodiment. And, when the drive frequency for the ultrasonic motor has dropped so far as to lie in the most suitable eleventh order resonance frequency band, then the transistor 116 is put into the non conducting state and also the relay 204 is closed, so that the phase locked loop form of control as described above for said drive frequency is started and the drive frequency is kept within the eleventh order resonance frequency band.

Furthermore, if it is ensured that the value of the resistance of the resistor 205 is sufficiently greater than the value of the resistance of the resistor 117, then even if the inverter 122, the AND gate 123, and the relay 204 are omitted no particular problem will occur.

In this manner, according to the construction and function of this second preferred embodiment of the present invention, two detector electrodes are provided on the piezoelectric transducer element within a span of one wavelength of the progressive wave of the resonance frequency band of the most suitable order, and based upon the phase difference between the output voltage waveforms from these two detector electrodes it is detected in which order of resonance frequency band the drive frequency for the ultrasonic motor lies, and the drive frequency setting circuit 2 is controlled so as to bring the drive frequency within that resonance frequency band which is previously determined as being most suitable for driving the ultrasonic motor. Accordingly, even if during operation of the ultrasonic motor its operating temperature or the load which it is driving should change, it is positively prevented that the drive frequency for the ultrasonic motor should wander out of said resonance frequency band which is previously determined as the most suitable resonance frequency band for driving the ultrasonic motor, and therefore it is possible to drive the ultrasonic motor stably without wandering or fluctuation of its rotation speed.

Preferred Embodiment 3

Figure 11:
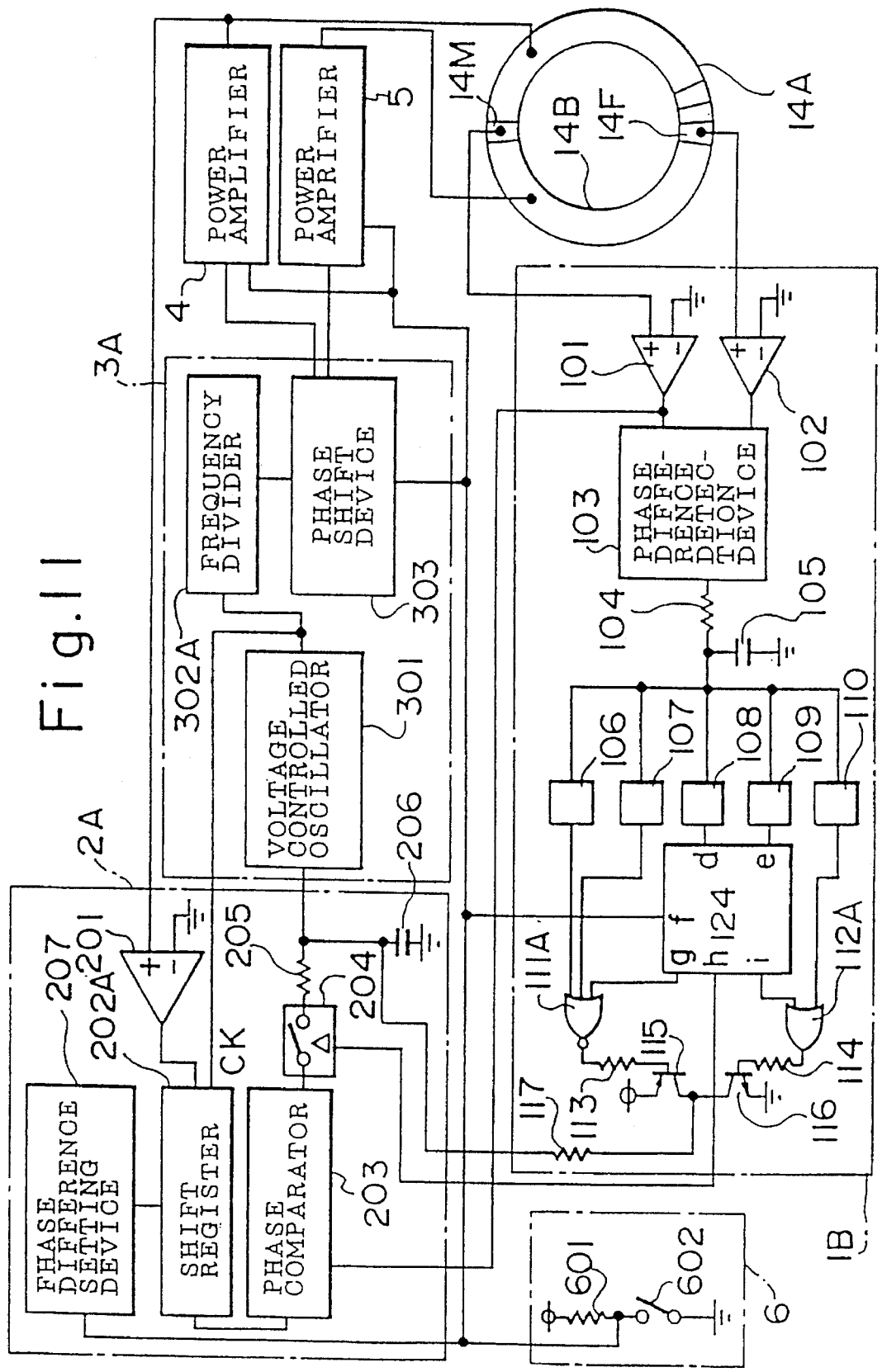
FIG. 11 is a block diagram showing the structure of the third preferred embodiment of the ultrasonic motor drive control device of the present invention.

The third preferred embodiment of the drive control device of the present invention for an ultrasonic motor will now be described. This third preferred embodiment is so constructed that the resonance frequency band for the ultrasonic motor is switched over to any resonance frequency band, and the ultrasonic motor is stably driven by a drive frequency in that resonance frequency band. FIG. 11 is a block diagram showing the structure of this third preferred embodiment of the ultrasonic motor drive control device of the present invention. In this figure, elements which correspond to elements in the first or second preferred embodiments of the present invention as shown in the FIG. 4 or FIG. 9 block diagrams, and which have the same functions, are designated by the same reference symbols, and explanation thereof will be curtailed in the interests of brevity. The present description will therefore focus upon the points in which this third preferred embodiment differs from the first and second preferred embodiments, as already disclosed.

Figure 12:
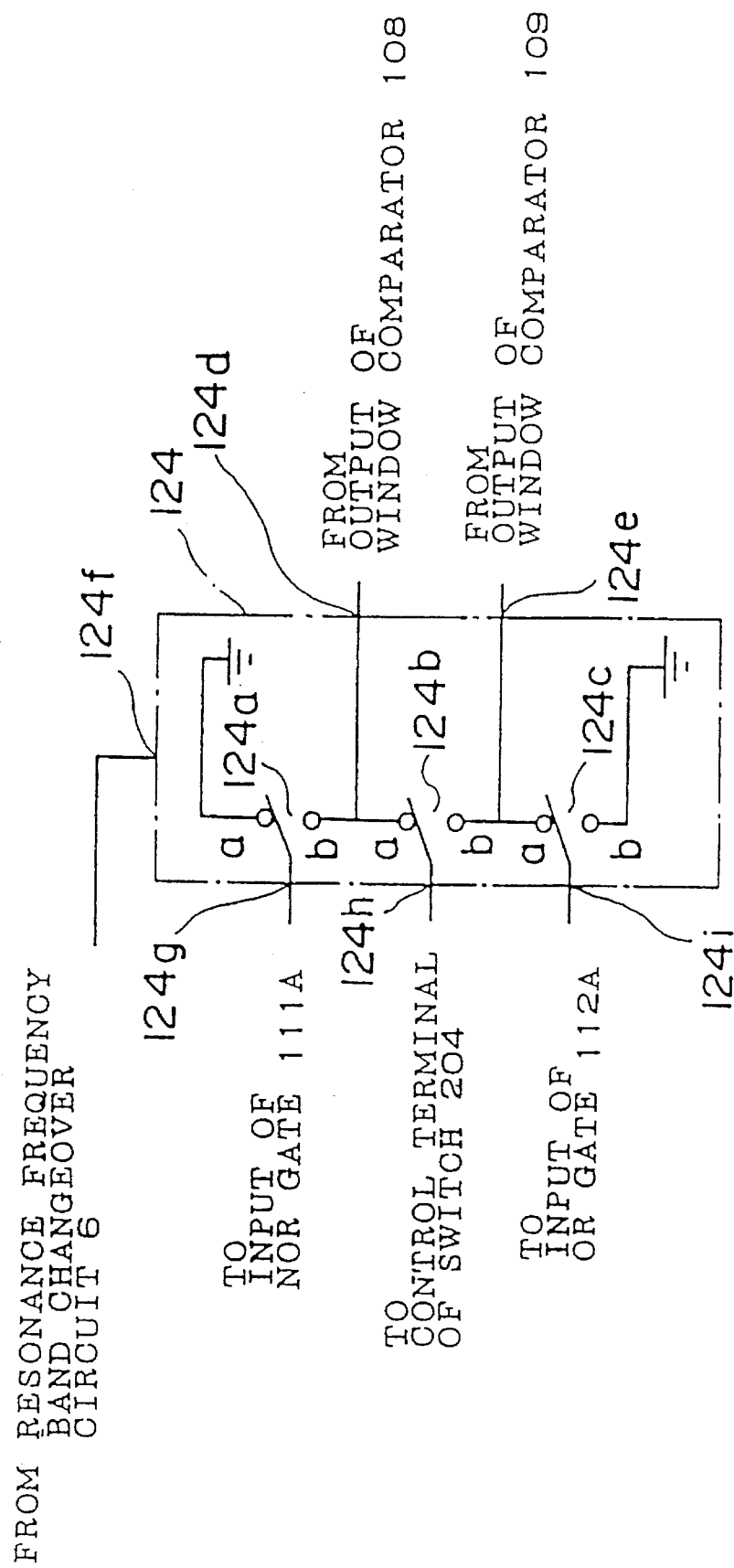
FIG. 12 is a block diagram showing the detailed structure of a signal selection device 124, included in the FIG. 11 structure.

The outputs of the window comparators 108 and 109 are respectively connected to input terminals 124*d* and 124*d* of a signal selection device 124. FIG. 12 is a block diagram showing the detailed structure of this signal selection device 124. The signal selection device 124 comprises three switches 124*a*, 124*b*, and 124*c*, and these switches 124*a*, 124*b*, and 124*c* are all switched over together according to supply of a changeover signal which is input to a control terminal 124*f* of this signal selection device 124 from a resonance frequency band changeover circuit 6 which will be described hereinafter. In detail, when a low level signal which indicates that the selected resonant frequency band is the eleventh order resonant frequency band is supplied to said control terminal 124*f* from the resonance frequency band changeover circuit 6, then each of the switches 124*a*, 124*b*, and 124*c* is switched over to its "a" side as shown in FIG. 12, so that the output signal at the input terminal 124*d* from the window comparator 108 is communicated via the switch 124*b* to the output terminal 124*h* and is supplied to a control terminal of a relay 204 of a drive frequency setting circuit 2A which will be described hereinafter, and the output signal at the input terminal 124*e* from the window comparator 109 is communicated via the switch 124*c* to the output terminal 124*i* and is supplied to an input terminal of an OR gate 112A which will be described hereinafter. Further, at this time, an input of a NOR gate 111A which also will be described hereinafter is connected to ground via the output terminal 124g of the signal selection device 124 and via the switch 124a thereof.

On the other hand, when a high level signal which indicates that the selected resonant frequency band is the twelfth order resonance frequency band is supplied to the control terminal 124f from the resonance frequency band changeover circuit 6, then each of the switches 124a, 124b, and 124c is switched over to its "b" side, so that the output signal from the window comparator 108 at the input terminal 124d is communicated via the switch 124a and the output terminal 124g to said input terminal of the NOR gate 111A, and also the output signal at the input terminal 124e from the window comparator 109 is supplied via the switch 124b and the output terminal 124h to the control terminal of the relay 204. Further, at this time, said input terminal of the OR gate 112A is connected to ground via the output terminal 124i and the switch 124c.

The outputs of the window comparators 106 and 107 and the output terminal 124g of the signal selection device 124 are connected to the three inputs of the NOR gate 111A, so that, when any of these three lines supplies a high level signal, a low level signal is output from said NOR gate 111A to the base of the transistor 115 via the resistor 113, whereby the transistor 115 is put into the conducting state. When the eleventh order resonance frequency band is set on the resonance frequency band changeover circuit 6, a low level signal is supplied from the output terminal 124g of the signal selection device 124 to the NOR gate 111A. At this time, if the ninth order resonance frequency band or the tenth order resonance frequency band is detected, a high level signal is supplied from the window comparator 106 or the window comparator 107 respectively to the NOR gate 111A, and thereby a low level signal is output from said NOR gate ilia to the base of the transistor 115 via the resistor 113, whereby the transistor 115 is put into the conducting state. On the other hand, if a resonance frequency band of the twelfth or a higher order is detected, low level signals are supplied both from the window comparator 106 and from the window comparator 107 to the NOR gate 111A, so that all of the inputs of said NOR gate 111A are low level at this time, and thereby a high level signal is output from said NOR gate 111A to the base of the transistor 115 via the resistor 113, whereby the transistor 115 is put into the non conducting state.

On the other hand, when the twelfth order resonance frequency band is set on the resonance frequency band changeover circuit 6, the output of the window comparator 108 is connected to the input terminal of the NOR gate 111A via the signal selection device 124. At this time, if the ninth order resonance frequency band, the tenth order resonance frequency band, or the eleventh order resonance frequency band is detected, a high level signal is supplied from the window comparator 106, the window comparator 107, or the window comparator 108 respectively to the NOR gate 111A, and thereby a low level signal is output from said NOR gate 111A to the base of the transistor 115 via the resistor 113, whereby the transistor 115 is put into the conducting state. On the other hand, if a resonance frequency band of the twelfth or a higher order is detected, low level signals are supplied from the window comparator 106, from the window comparator 107, and from the window comparator 108 to the NOR gate 111A, so that all of the inputs of said NOR gate 111A are low level at this time, and thereby a high level signal is output from said NOR gate 111A to the base of the transistor 115 via the resistor 113, whereby the transistor 115 is put into the non conducting state.

The output of the window comparator 110 and the output terminal 124i of the signal selection device 124 are connected to the two inputs of the OR gate 112A, and, when either of these is supplying a high level signal, a high level signal is output from said OR gate 112A to the base of the transistor 116 via the resistor 114, whereby the transistor 116 is put into the conducting state.

When the eleventh order resonance frequency band is set on the resonance frequency band changeover circuit 6, the output of the window comparator 109 is connected to the input terminal of the OR gate 112A via the signal selection device 124. At this time, if the twelfth order resonance frequency band or the thirteenth order resonance frequency band is detected, a high level signal is supplied from the window comparator 109 or the window comparator 110 respectively to the OR gate 112A, and thereby a high level signal is output from said OR gate 112A to the base of the transistor 116 via the resistor 114, whereby the transistor 116 is put into the conducting state. On the other hand, if a resonance frequency band of the eleventh or a lower order is detected, low level signals are supplied both from the window comparator 109 and from the window comparator 110 to the OR gate 112A, so that all of the inputs of said OR gate 112A are low level at this time, and thereby a low level signal is output from said OR gate 112A to the base of the transistor 116 via the resistor 114, whereby the transistor 115 is put into the non conducting state.

On the other hand, when the twelfth order resonance frequency band is set on the resonance frequency band changeover circuit 6, a low level signal is supplied to the input terminal of the OR gate 112A from the output terminal 124i of the signal selection device 124. At this time, if the thirteenth order resonance frequency band is detected, a high level signal is supplied from the comparator 110 to the OR gate 112A, and thereby a high level signal is output from said NOR gate 112A to the base of the transistor 116 via the resistor 114, whereby the transistor 116 is put into the conducting state. On the other hand, if a resonance frequency band of the twelfth or a lower order is detected, low level signals are supplied both from the window comparator 110 and from the output terminal 124i of the signal selection device 124 to the OR gate 112A, so that all of the inputs of said OR gate 112A are low level at this time, and thereby a low level signal is output from said OR gate 112A to the base of the transistor 116 via the resistor 114, whereby the transistor 116 is put into the non conducting state.

The resonance frequency band changeover circuit 6 comprises a resistor 601 and a switch 602. One end of the resistor 601 is connected to line voltage and the other end is selectably connected to ground via the switch 602, with the output signal of this resonance frequency band changeover circuit 6 being taken from said other end of said resistor 601. Thus, when the eleventh order resonance frequency band is to be set as the drive frequency resonance frequency band, then the switch 602 is closed, and a low level signal is output to each of the resonant wave order detection circuit 1B, the drive frequency setting circuit 2A, the oscillation generating phase shift circuit 3A, and the power amplifiers 4 and 5. On the other hand, when the twelfth order resonance frequency band is to be set as the drive frequency resonance frequency band, then the switch 602 is opened, and a high level signal is output to each of the above listed circuits.

When the eleventh order resonance frequency band is set on this resonance frequency band changeover circuit 6 as the drive frequency resonance frequency band, the output signal of the window comparator 108 is connected to the control terminal of the relay 204 of the drive frequency setting circuit 2A via the signal selection device 124. When the drive frequency for the ultrasonic motor lies within the eleventh order resonance frequency band, then a high level signal is output from the window comparator 108 via the signal selection device 124 to said control terminal of said relay 204, and thereby said relay 204 is closed. At this time, as detailed above, both of the transistors 115 and 116 are in the non conducting state, so that the end of the resistor 117 which is connected to the collectors of these two transistors 115 and 116 is isolated, and thereby the capacitor 206 of the drive frequency setting circuit 2A is neither charged up nor discharged through this resistor 117.

However, when the drive frequency for the ultrasonic motor lies within either the ninth order resonance frequency band or the tenth order resonance frequency band, both being resonance frequency bands lower than the eleventh order resonance frequency band, then a low level signal is output from the window comparator 108 via the signal selection device 124 to the control terminal of the relay 204, and thereby said relay 204 is opened. At this time, as detailed above, the transistor 115 is in the conducting state while the transistor 116 is in the non conducting state, so that the capacitor 206 of the drive frequency setting circuit 2A is supplied with line voltage via the transistor 115 and the resistor 117, and is thereby charged up.

On the other hand, when the drive frequency for the ultrasonic motor lies within either the twelfth order resonance frequency band or the thirteenth order resonance frequency band, both being resonance frequency bands higher than the eleventh order resonance frequency band, then as before a low level signal is output from the window comparator 108 via the signal selection device 124 to the control terminal of the relay 204, and thereby said relay 204 is again opened. At this time, again as detailed above, the transistor 115 is in the non conducting state while the transistor 116 is in the conducting state, so that the capacitor 206 of the drive frequency setting circuit 2A is connected to ground via the transistor 116 and the resistor 117, and is thereby discharged.

When, by contrast, the twelfth order resonance frequency band is set on the resonance frequency band changeover circuit 6 as the drive frequency resonance frequency band, the output signal of the window comparator 109 is connected to the control terminal of the relay 204 of the drive frequency setting circuit 2A via the signal selection device 124. When the drive frequency for the ultrasonic motor lies within the twelfth order resonance frequency band, then a high level signal is output from the window comparator 109 via the signal selection device 124 to said control terminal of said relay 204, and thereby said relay 204 is closed. At this time, as detailed above, both of the transistors 115 and 116 are in the non conducting state, so that the end of the resistor 117 which is connected to the collectors of these two transistors 115 and 116 is isolated, and thereby the capacitor 206 of the drive frequency setting circuit 2A is neither charged up nor discharged through this resistor 117.

However, when the drive frequency for the ultrasonic motor lies within any one of the ninth order resonance frequency band, the tenth order resonance frequency band, or the eleventh order resonance frequency band, all being resonance frequency bands lower than the twelfth order resonance frequency band, then a low level signal is output from the window comparator 109 via the signal selection device 124 to the control terminal of the relay 204, and thereby said relay 204 is opened. At this time, as detailed above, the transistor 115 is in the conducting state while the transistor 116 is in the non conducting state, so that the capacitor 206 of the drive frequency setting circuit 2A is supplied with line voltage via the transistor 115 and the resistor 117, and is thereby charged up.

On the other hand, when the drive frequency for the ultrasonic motor lies within the thirteenth order resonance frequency band which is a resonance frequency band higher than the twelfth order resonance frequency band, then as before a low level signal is output from the window comparator 109 via the signal selection device 124 to the control terminal of the relay 204, and thereby said relay 204 is again opened. At this time, again as detailed above, the transistor 115 is in the non conducting state while the transistor 116 is in the conducting state, so that the capacitor 206 of the drive frequency setting circuit 2A is connected to ground via the transistor 116 and the resistor 117, and is thereby discharged.

The drive frequency setting circuit 2A comprises a waveform shaping device 201, a shift register 202A, a phase comparator 203, the previously mentioned relay 204, a resistor 205, the previously mentioned capacitor 206, and a phase difference setting device 207, and is capable of setting the drive frequency for the ultrasonic motor to either the frequency of the eleventh order resonance frequency band or the frequency of the twelfth order resonance frequency band, according to requirements.

The input of the waveform shaping device 201 is connected to the one input electrode group 14A of this ultrasonic motor, and said waveform shaping device 201 waveform shapes the drive voltage waveform which is supplied to said input electrode group 14A into a square wave, which it outputs to the shift register 202. The output of the previously described voltage controlled oscillator 301 is connected to the clock terminal CK of the shift register 202A, and thereby inputs a pulse signal of a predetermined frequency to said clock terminal CK. The shift register 202A counts the clock pulses thus input to its clock terminal CK, and delays the drive voltage waveform which it inputs from the waveform shaping device 201 by a time period which is defined by a number of said clock pulses determined by the phase difference setting device 207.

The phase comparator 203 receives as input this waveform shaped and delayed drive voltage waveform from the shift register 202A and also receives as input the output voltage waveform from the detector electrode 14M after it has been waveform shaped by the waveform shaping device 101, compares these two input waveforms, and outputs a DC voltage signal according to the phase difference between them. The relay 204 is controlled by the output signal from the terminal 124*h* of the previously described signal selection device 124 of the resonant wave order detection circuit 1B, and is caused to go closed circuit when said output signal from said signal selection device 124 is high level, while it goes open circuit when said output signal from said signal selection device 124 is low level. Therefore, when the drive frequency is within that one of the eleventh order resonance frequency band and the twelfth order resonance frequency band which is selected by the resonance frequency band changeover circuit 6, the relay 204 is closed, whereby the output voltage from the phase comparator 203 is supplied via the resistor 205 to the capacitor 206. On the other hand, when the drive frequency is not within said selected eleventh order resonance frequency band or twelfth order resonance frequency band, the relay 204 is open, whereby the output voltage from the phase comparator 203 is isolated from the resistor 205 and from the capacitor 206. And the phase difference setting device 207 sets and outputs to the shift register 202A a number of clock pulses corresponding to the phase difference which corresponds to the resonance frequency band which is set on the resonance frequency band changeover circuit 6.

Furthermore, if it is ensured that the value of the resistance of the resistor 205 is sufficiently greater than the value of the resistance of the resistor 117, then even if the window comparator 108 and the relay 204 are omitted no particular problem will occur.

The oscillation generating phase shift circuit 3A comprises the voltage controlled oscillator 301, a frequency divider 302A, and a phase shift device 303, and generates an AC output signal having the same frequency as the drive frequency set by the drive frequency setting circuit 2 but having a fixed phase difference with respect thereto. The voltage controlled oscillator 301 generates an AC output signal having a frequency determined according to the DC voltage which it inputs from the drive frequency setting circuit 2A, and outputs said AC output signal to the frequency divider 302A and to the shift register 202A. The frequency divider 302A frequency divides this AC output signal which it receives from the voltage controlled oscillator 301 to a signal of the required frequency, which it outputs to the phase shift device 303. From this frequency divided signal which it receives from the frequency divider 302A, the phase shift device 303 generates two AC output signals which it outputs to the power amplifiers 4 and 5, said two output signals having a mutual phase difference determined according to which one of the eleventh order resonance frequency band and the twelfth order resonance frequency band is selected by the resonance frequency band changeover circuit 6.

The power amplifiers 4 and 5 amplify these AC output signals which they receive from the oscillation generating phase shift circuit 3A into drive voltage signals, and supply these drive voltage signals to the input electrode groups 14A and 14B.

Figure 13:
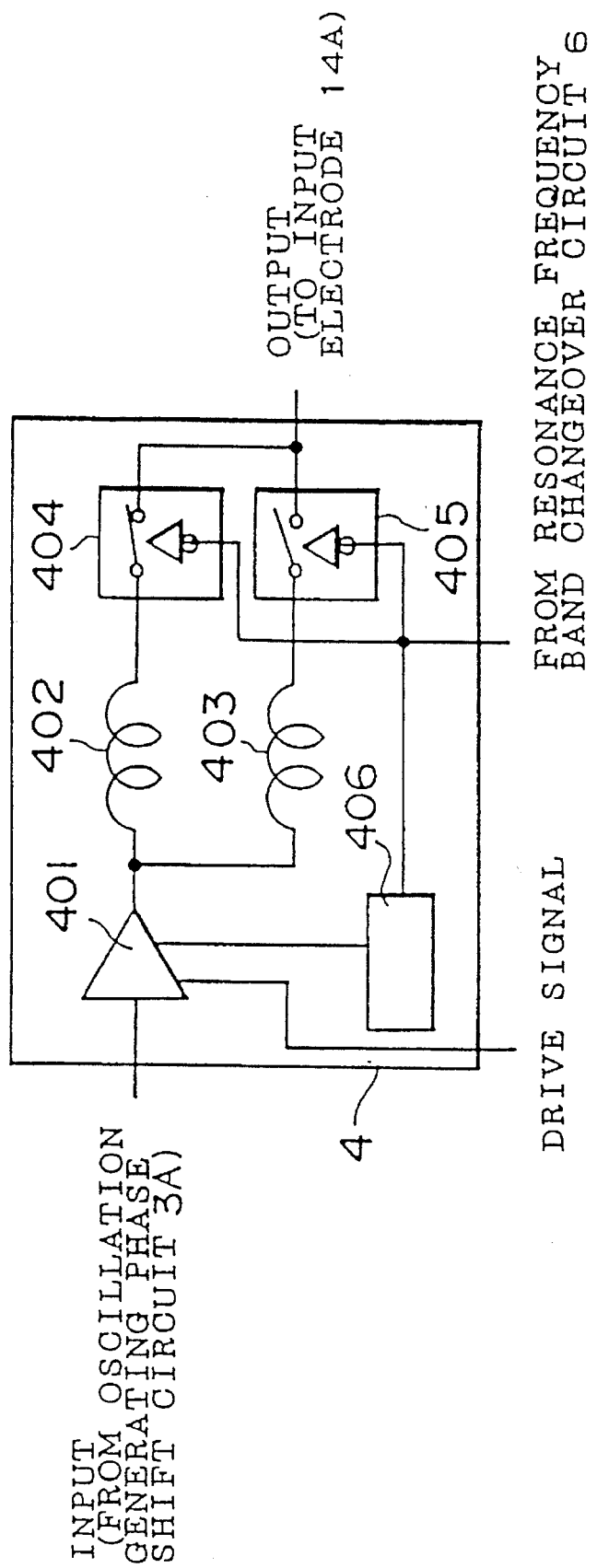
FIG. 13 is a block diagram showing the detailed structure of a power amplifier 4, included in the FIG. 11 structure.

FIG. 13 is a block diagram showing the detailed structure of the power amplifier 4; the other power amplifier 5 is similar in construction, and accordingly is not particularly shown. This power amplifier 4 comprises an amplifier 401, a variable voltage source 406 which supplies power to said amplifier 401, inductors 402 and 403, a relay 404 for selecting the inductor 402, and another relay 405 for selecting the inductor 403.

The amplifier 401 receives input of the AC signal from the oscillation generating phase shift circuit 3A, and is also supplied with a drive signal from a control circuit for this ultrasonic motor which is not shown in the figures and with electrical energy from the variable voltage source 406, and, when a drive signal from this control circuit is provided to said power amplifier 4, it amplifies the input AC signal and outputs it to the two inductors 402 and 403, while when said power amplifier 4 receives no such drive signal from said control circuit it provides no such output.

The inductance of the inductor 402 is arranged to be the most suitable inductance value for when this ultrasonic motor is being driven by a drive frequency which is in the eleventh order resonance frequency band, while the inductance of the inductor 403 is arranged to be the most suitable inductance value for when this ultrasonic motor is being driven by a drive frequency which is in the twelfth order resonance frequency band. The relay 404 is constituted so as to close its contacts when and only when it receives a low level signal at its control terminal from the resonance frequency band changeover circuit 6, i.e. when and only when it receives the control signal which also sets the eleventh order resonance frequency band, and therefore at this time it inserts into the output of this power amplifier 4 the inductance of the inductor 402, which is the appropriate inductance value for when this ultrasonic motor is being driven by a drive frequency which is in the eleventh order resonance frequency band. On the other hand, the relay 405 is constituted so as to close its contacts when and only when it receives a high level signal at its control terminal from the resonance frequency band changeover circuit 6, i.e. when and only when it receives the control signal which also sets the twelfth order resonance frequency band, and therefore at this time it inserts into the output of this power amplifier 4 the inductance of the inductor 403, which is the appropriate inductance value for when this ultrasonic motor is being driven by a drive frequency which is in the twelfth order resonance frequency band.

The variable voltage source 406 receives the resonance frequency band setting signal from the resonance frequency band changeover circuit 6 which sets either the eleventh order resonance frequency band or the twelfth order resonance frequency band, and supplies electrical power to the amplifier 401 at a voltage which depends upon which of said resonance frequency bands is currently set. The applicant of the present application has made various experiments (details of which are omitted in the interests of brevity) which indicate that it is desirable for the voltage output characteristic of the variable voltage source 406 to be such that the output voltage thereof by which the amplifier 401 is driven is lower when the drive frequency for the ultrasonic motor lies within the twelfth order resonance frequency band than when said drive frequency lies within the eleventh order resonance frequency band.

With the above described drive control device, the resonance frequency band for the drive frequency for the ultrasonic motor is set by the resonance frequency band changeover circuit 6 to be either the eleventh order resonance frequency band or the twelfth order resonance frequency band, and, when the drive frequency for the ultrasonic motor is detected by the resonant wave order detection circuit 1B as being a frequency which lies within the resonance frequency band of the set order, then as described above the relay 204 is closed and simultaneously the resistor 117 is put into the isolated state, so that the drive frequency setting circuit 2A, the oscillation generating phase shift circuit 3A, the power amplifiers 4 and 5, and the ultrasonic motor at this time constitute a negative feedback control type phase locked loop, which controls so as to keep the drive frequency at the resonance frequency band of the set order. Now, this action will be explained.

First, the operation will be explained upon the supposition that it is the eleventh order resonance frequency band which is set by the resonance frequency band changeover circuit 6. Supposing that the output frequency of the voltage controlled oscillator 301 is divided by a ratio 1/P by the frequency divider 302A, then one cycle of the output signal of said voltage controlled oscillator 301 will correspond to 360 degrees/P of phase difference. Accordingly, if the exact number of clock pulses ($\Phi$1/360 deg/P) which corresponds to the phase difference $\Phi$1 shown in FIG. 19 is set in the shift register 202A, then the output voltage waveform from the shift register 202A will be in phase with the output voltage waveform of the detector electrode 14M, and the drive frequency will be the frequency F11' as shown in FIG. 19.

If the drive frequency is less than F11', then, since the phase difference is less than $\Phi$1, the output voltage waveform from the shift register 202A is delayed in phase as compared with the output voltage waveform of the detector electrode 14M, and therefore the output voltage of the phase comparator 203 will rise and the voltage at the non ground terminal of the capacitor 206 will rise. Due to this, the input voltage to the voltage controlled oscillator 301 will rise, and therefore the frequency of its output will rise. And, when this frequency arrives at F11', then the output voltage waveform from the shift register 202A will be in phase with the output voltage waveform of the detector electrode 14M, and therefore the output voltage of the phase comparator 203 will stop rising and become constant. As a result, the voltage at the non ground terminal of the capacitor 206 will also stop rising and become constant, so that the input voltage to the voltage controlled oscillator 301 will also stop rising and become constant, which means that the frequency of the output signal from said voltage controlled oscillator 301 will also stop rising and become constant. In other words, the drive frequency for the ultrasonic motor will reach and remain at the frequency F11' within the eleventh order resonance frequency band.

On the other hand, supposing that the drive frequency is greater than F11', then, since the phase difference is greater than $\Phi 1$, the output voltage waveform from the shift register 202A is advanced in phase as compared with the output voltage waveform of the detector electrode 14M, and therefore the output voltage of the phase comparator 203 will drop and the voltage at the non ground terminal of the capacitor 206 will drop. Due to this, the input voltage to the voltage controlled oscillator 301 will drop, and therefore the frequency of its output signal will drop. And, when this frequency arrives at F11', then the output voltage waveform from the shift register 202A will be in phase with the output voltage waveform of the detector electrode 14M, and therefore the output voltage of the phase comparator 203 will stop dropping and become constant. As a result, the voltage at the non ground terminal of the capacitor 206 will also stop dropping and become constant, so that the input voltage to the voltage controlled oscillator 301 will also stop dropping and become constant, which means that the frequency of the output signal from said voltage controlled oscillator 301 will also stop dropping and become constant. In other words, the drive frequency for the ultrasonic motor will reach and remain at the frequency F11' within the eleventh order resonance frequency band.

If the drive frequency is detected by the resonant wave order detection circuit 1B as being a frequency which lies in some resonance frequency band other than the eleventh order resonance frequency band, then as described above the relay 204 is opened and therefore the phase comparator 203 and the resistor 205 are disconnected from one another. Further, either the transistor 115 or the transistor 116 controls, via the resistor 117, the voltage at the non ground terminal of the capacitor 206.

When the drive frequency is in fact detected by the resonant wave order detection circuit 1 as being a frequency which lies in a lower order resonance frequency band than the eleventh order resonance frequency band, i.e. in the ninth order resonance frequency band or in the tenth order resonance frequency band, then as described above the transistor 115 is in the conducting state, while the transistor 116 is in the non conducting state. Therefore, at this time, the power source voltage is transmitted via the transistor 115 and the resistor 117 to the capacitor 206, whereby said capacitor 206 is charged up and the voltage at its non ground terminal rises. By this, the input voltage to the voltage controlled oscillator 301 rises, so that the frequency of its output signal also rises. In other words, the drive frequency for the ultrasonic motor rises. When this drive frequency has risen so far as to lie within the eleventh order resonance frequency band, the transistor 115 goes into the non conducting state along with the transistor 116 which remains in the non conducting state, and thereby the charging up process for the capacitor 206 is terminated. At the same time the relay 204 is closed, so that the above described phase lock loop type of control commences and the drive frequency is controlled to be equal to the frequency F11' within the eleventh order resonance frequency band.

On the other hand, when the drive frequency is in fact detected by the resonant wave order detection circuit 1 as being a frequency which lies in a higher order resonance frequency band than the eleventh order resonance frequency band, i.e. in the twelfth order resonance frequency band or in the thirteenth order resonance frequency band, then as described above the transistor 115 is in the non conducting state, while the transistor 116 is in the conducting state. Therefore, at this time, the capacitor 206 is connected to ground via the transistor 116 and the resistor 117, whereby said capacitor 206 is discharged and the voltage at its non ground terminal drops. By this, the input voltage to the voltage controlled oscillator 301 drops, so that the frequency of its output signal also drops. In other words, the drive frequency for the ultrasonic motor drops. When this drive frequency has dropped so far as to lie within the eleventh order resonance frequency band, the transistor 116 goes into the non conducting state along with the transistor 115 which remains in the non conducting state, and thereby the discharging process for the capacitor 206 is terminated. At the same time the relay 204 is closed, so that the above described phase lock loop type of control commences and the drive frequency is controlled to be equal to the frequency F11' within the eleventh order resonance frequency band.

Next, the operation will be explained upon the supposition that it is the twelfth order resonance frequency band which is set by the resonance frequency band changeover circuit 6. If the exact number of clock pulses ($\Phi 2/360$ deg/P) which corresponds to the phase difference $\Phi 2$ shown in FIG. 19 is set in the shift register 202A, then the output voltage waveform from the shift register 202A will be in phase with the output voltage waveform of the detector electrode 14M at the drive frequency F120' as shown in FIG. 19.

If the drive frequency is less than F120', then, since the phase difference is less than $\Phi 2$, the output voltage waveform from the shift register 202A is delayed in phase as compared with the output voltage waveform of the detector electrode 14M, and therefore the output voltage of the phase comparator 203 will rise and the voltage at the non ground terminal of the capacitor 206 will rise. Due to this, the input voltage to the voltage controlled oscillator 301 will rise, and therefore the frequency of its output will rise. And, when this frequency arrives at F120', then the output voltage waveform from the shift register 202A will be in phase with the output voltage waveform of the detector electrode 14M, and therefore the output voltage of the phase comparator 203 will stop rising and become constant. As a result, the voltage at the non ground terminal of the capacitor 206 will also stop rising and become constant, so that the input voltage to the voltage controlled oscillator 301 will also stop rising and become constant, which means that the frequency of the output signal from said voltage controlled oscillator 301 will also stop rising and become constant. In other words, the drive frequency for the ultrasonic motor will reach and remain at the frequency F120' within the twelfth order resonance frequency band.

On the other hand, supposing that the drive frequency is greater than F120', then, since the phase difference is greater than $\Phi 2$, the output voltage waveform from the shift register 202A is advanced in phase as compared with the output voltage waveform of the detector electrode 14M, and therefore the output voltage of the phase comparator 203 will drop and the voltage at the non ground terminal of the capacitor 206 will drop. Due to this, the input voltage to the voltage controlled oscillator 301 will drop, and therefore the frequency of its output signal will drop. And, when this frequency arrives at F120', then the output voltage waveform from the shift register 202A will be in phase with the output voltage waveform of the detector electrode 14M, and therefore the output voltage of the phase comparator 203 will stop dropping and become constant. As a result, the voltage at the non ground terminal of the capacitor 206 will also stop dropping and become constant, so that the input voltage to the voltage controlled oscillator 301 will also stop dropping and become constant, which means that the frequency of the output signal from said voltage controlled oscillator 301 will also stop dropping and become constant. In other words, the drive frequency for the ultrasonic motor will reach and remain at the frequency F120' within the twelfth order resonance frequency band.

If the drive frequency is detected by the resonant wave order detection circuit 1B as being a frequency which lies in some resonance frequency band other than the twelfth order resonance frequency band, then as described above the relay 204 is opened and therefore the phase comparator 203 and the resistor 205 are disconnected from one another. Further, either the transistor 115 or the transistor 116 controls, via the resistor 117, the voltage at the non ground terminal of the capacitor 206.

When the drive frequency is in fact detected by the resonant wave order detection circuit 1 as being a frequency which lies in a lower order resonance frequency band than the twelfth order resonance frequency band, i.e. in the ninth order resonance frequency band, in the tenth order resonance frequency band, or in the eleventh order resonance frequency band, then as described above the transistor 115 is in the conducting state, while the transistor 116 is in the non conducting state. Therefore, at this time, the power source voltage is transmitted via the transistor 115 and the resistor 117 to the capacitor 206, whereby said capacitor 206 is charged up and the voltage at its non ground terminal rises. By this, the input voltage to the voltage controlled oscillator 301 rises, so that the frequency of its output signal also rises. In other words, the drive frequency for the ultrasonic motor rises. When this drive frequency has risen so far as to lie within the twelfth order resonance frequency band, the transistor 115 goes into the non conducting state along with the transistor 116 which remains in the non conducting state, and thereby the charging up process for the capacitor 206 is terminated. At the same time the relay 204 is closed, so that the above described phase lock loop type of control commences and the drive frequency is controlled to be equal to the frequency F120' within the twelfth order resonance frequency band.

On the other hand, when the drive frequency is in fact detected by the resonant wave order detection circuit 1 as being a frequency which lies in a higher order resonance frequency band than the twelfth order resonance frequency band, i.e. in the thirteenth order resonance frequency band, then as described above the transistor 115 is in the non conducting state, while the transistor 116 is in the conducting state. Therefore, at this time, the capacitor 206 is connected to ground via the transistor 116 and the resistor 117, whereby said capacitor 206 is discharged and the voltage at its non ground terminal drops. By this, the input voltage to the voltage controlled oscillator 301 drops, so that the frequency of its output signal also drops. In other words, the drive frequency for the ultrasonic motor drops. When this drive frequency has dropped so far as to lie within the twelfth order resonance frequency band, the transistor 116 goes into the non conducting state along with the transistor 115 which remains in the non conducting state, and thereby the discharging process for the capacitor 206 is terminated. At the same time the relay 204 is closed, so that the above described phase lock loop type of control commences and the drive frequency is controlled to be equal to the frequency F120' within the twelfth order resonance frequency band.

When the resonance frequency band is switched over between the eleventh order resonance frequency band and the twelfth order resonance frequency band by the resonance frequency band changeover circuit 6, drive voltage, the phase difference between the drive voltages which are supplied to the input electrode groups 14A and 14B, and the inductors 402 and 403 corresponding to the predetermined resonance frequency band are switched over. However, the drive frequency does not change immediately to the frequency of the predetermined resonance frequency band in a stepwise fashion, but changes relatively slowly along with the change in the voltage on the non ground terminal of the capacitor 206, as said capacitor 206 is charged or discharged via the resistor 117. In detail, the time required for the drive frequency to change to the frequency of the predetermined resonance frequency band is proportional to a time constant determined by the resistance value of the resistor 117 and the capacitance of the capacitor 206. Normally, by making the resistance value of the resistor 117 small enough, the changeover to the frequency of the predetermined resonance frequency band is completed within a relatively short time period, so that there is no danger of any instability in the driving operation of the ultrasonic motor developing during this operation of changing over between the resonance frequency bands. However, if it is necessary to change over the drive frequency slowly, it is desirable to set the drive voltage, the phase difference between the drive voltages which are supplied to the input electrode groups 14A and 14B, and the inductance values of the inductors 402 and 403 corresponding to the order of the resonance frequency bands detected by the window comparators 106 through 110.

In this manner, since the above described construction and operation according to this third preferred embodiment of the present invention are such that the drive frequency band for the ultrasonic motor is switched over to the predetermined resonance frequency band for the drive conditions, the frequency of this resonance frequency band is set as the drive frequency for the ultrasonic motor, the order of the resonance frequency band in which the drive frequency lies is detected based upon the phase difference between the output voltage waveforms from two detector electrodes provided on the piezoelectric transducer element, and the drive frequency for the ultrasonic motor is always controlled so as to be the frequency of the resonance frequency band which has been switched over to, thereby, when the drive frequency band for the ultrasonic motor has been switched over to the predetermined resonance frequency band for the drive conditions, it is possible to drive the ultrasonic motor stably at the drive frequency of this resonance frequency band.

Further, because, when the resonant frequency band is switched over, along with setting the drive voltages which are supplied to the two input electrode groups of the ultrasonic motor according to the resonant frequency band which is switched over to and also setting the phase difference between the waveforms of said drive voltages, also an inductor is switched into the output of the power amplifier of appropriate inductance value corresponding to the resonant frequency band which is switched over to, thereby it is possible to drive the ultrasonic motor stably at the drive frequency of this resonance frequency band which has been switched over to.

Now, the arrangement of the drive electrodes and the detector electrodes on the piezoelectric transducer element is not to be considered as being limited to the arrangements shown and disclosed above. Further, although in the above described preferred embodiments of the present invention the pair of electrodes 14M and 14F, or the pair of electrodes 14E and 14F, were exemplarily used as the detector electrodes, it would also be possible to use other electrodes as the detector electrodes, in alternative embodiments.

Further, if either the power amplifier 4 or 5 is operated by itself before starting up the ultrasonic motor, and the drive voltage produced thereby is supplied to either one of the input electrode groups 14A or 14B by itself, and drive voltage is supplied to the other one of the input electrode groups only after the drive frequency has been controlled so as to become the drive frequency of the most desirable resonant frequency band, thereby it is possible to start up the ultrasonic motor in a stable fashion, and accordingly it is possible to reduce the starting up time.

Yet further, if for example it is desire to set the drive frequency for the ultrasonic motor to the most suitable drive frequency by scanning from the high frequency side of the normally used most suitable resonant frequency band, then it is expedient first to temporarily set said drive frequency to the frequency of the resonant frequency band one higher than the normally used resonant frequency band, and only then to switch over to said normally used resonant frequency band.

Although in the shown and disclosed three preferred embodiments of the present invention the explanation has been made by way of example in terms of a drive control device which controls the drive frequency for the ultrasonic motor based upon phase difference between the drive voltage waveform supplied to an input electrode group and the output voltage waveforms from detector electrodes, it would be possible to apply the present invention to drive control devices which employed other methods of control. Various other possible alterations could be made in the construction and operation of any particular embodiment of the present invention without departing from its essential principles. Accordingly, although the present invention has been shown and described in terms of several preferred embodiments thereof, it is not thereby to be considered as limited by any of the perhaps quite fortuitous details of said embodiments or of the drawings, but only by the terms of the appended claims, which follow.

I claim:

1. A drive control device for an ultrasonic motor, in which two AC signals having a fixed phase difference are supplied to two input electrode groups on an electromagnetic energy to mechanical energy conversion element, and which drives a movable element by generating a progressive wave in a fixed element by said electromagnetic energy to mechanical energy conversion element, wherein at least two detector electrodes are provided on said electromagnetic energy to mechanical energy conversion elements, and comprising a frequency band control means which, based upon a phase difference between the output signals from said detector electrodes, performs control so as to bring the frequency of said two AC signals to be within a desired order resonance frequency band among a plurality of resonant frequency bands.

2. A drive control device for an ultrasonic motor, in which two AC signals having a fixed phase difference are supplied to two input electrode groups on an electromagnetic energy to mechanical energy conversion element, and which drives a movable element by generating a progressive wave in a fixed element by said electromagnetic energy to mechanical energy conversion element, comprising:

a frequency band control means which, based upon a phase difference between the output signals from at least two detector electrodes provided on said electromagnetic energy to mechanical energy conversion element, performs control so as to bring the frequency of said two AC signals to be within a desired order resonance frequency band among a plurality of resonant frequency bands; and a drive frequency control means which, after the frequency of said two AC signals has reached the frequency of the desired order resonance frequency band, controls said frequency of said two AC signal to be a predetermined drive frequency.

3. A drive control device for an ultrasonic motor which drives a movable element by generating a progressive wave in a fixed element by an electromagnetic energy to mechanical energy conversion element, comprising:

(a) a frequency setting means which sets the drive frequency of said ultrasonic motor;

(b) a resonance order detection means which detects in which order of resonance frequency band the drive frequency of said ultrasonic motor lies, based upon the output signals from at least two detector electrodes which are provided on said electromagnetic energy to mechanical energy conversion element;

(c) a frequency band control means which controls said frequency setting means so as to bring the drive frequency of said ultrasonic motor to the frequency of a predetermined order resonance frequency band, based upon the order of resonance frequency band detected by said resonance order detection means;

(d) a phase shifting oscillator means, which generates two AC signals with the drive frequency set by said frequency setting means, having a fixed phase difference between them; and:

(e) a power amplifier means which amplifies said two AC signals which are generated by said phase shifting oscillator means, and supplies them to two input electrode groups which are provided on said electromagnetic energy to mechanical energy conversion element.

4. A drive control device for an ultrasonic motor according to claim 3, wherein said resonance order detection means comprises a phase difference detection device which compares the phases of the output voltages from said two detector electrodes and outputs a voltage according to their phase difference, and a plurality of comparators which output resonance order detection signals when the output voltage of said phase difference detection device reaches voltages set according to resonance orders.

5. A drive control device for an ultrasonic motor according to claim 3, wherein a common electrode is provided on said electromagnetic energy to mechanical energy conversion element as a said detector electrode.

6. A drive control device for an ultrasonic motor according to claim 3, wherein a common electrode is provided on said electromagnetic energy to mechanical energy conversion element and is divided into a plurality of portions, of which at least one portion serves as a said detector electrode.

7. A drive control device for an ultrasonic motor according to claim 3, wherein said two detector electrodes are positioned within one wavelength of said progressive wave apart.

8. A drive control device for an ultrasonic motor according to claim 3, wherein said frequency setting means, after said drive frequency of said ultrasonic motor has reached the frequency of a predetermined resonance frequency band, controls said drive frequency to lie within said predetermined resonance frequency band.

9. A drive control device for an ultrasonic motor according to claim 3, wherein said power amplifier means when starting said ultrasonic motor supplies driving voltage to one only of said two input electrode groups, and, after in this state it has performed control so as to bring the drive frequency of said ultrasonic motor to the frequency of said predetermined resonance frequency band according to said frequency band control means, supplies driving voltage to the other one of said two input electrode groups as well, and thereby starts said ultrasonic motor.

10. A drive control device for an ultrasonic motor according to claim 3, wherein said electromagnetic energy to mechanical energy conversion element is a piezoelectric transducer element.

11. A drive control device for an ultrasonic motor which drives a movable element by generating a progressive wave in a fixed element by an electromagnetic energy to mechanical energy conversion element, comprising:

(a) a frequency setting means which sets the drive frequency of said ultrasonic motor;

(b) a frequency band switchover means which switches over the resonance frequency band of said ultrasonic motor to any one of a plurality of resonance frequency bands;

(c) a resonance order detection means which detects in which order of resonance frequency band the drive frequency of said ultrasonic motor lies, based upon the output signals from at least two detector electrodes which are provided on said electromagnetic energy to mechanical energy conversion element;

(d) a frequency band control means which controls said frequency setting means so as to bring the drive frequency of said ultrasonic motor to the frequency of the resonance frequency band switched over to by said frequency band switchover means, based upon the order of resonance frequency band detected by said resonance order detection means;

(e) a phase shifting oscillator means which generates two AC signals with the drive frequency set by said frequency setting means, having a fixed phase difference between them; and:

(f) a power amplifier means which amplifies said two AC signals which are generated by said phase shifting oscillator means, and supplies them to two input electrode groups which are provided on said electromagnetic energy to mechanical energy conversion element.

12. A drive control device for an ultrasonic motor according to claim 11, wherein said resonance order detection means comprises a phase difference detection device which compares the phases of the output voltages from said two detector electrodes and outputs a voltage according to their phase difference, and a plurality of comparators which output resonance order detection signals when the output voltage of said phase difference detection device reaches voltages set according to resonance orders.

13. A drive control device for an ultrasonic motor according to claim 11, wherein said phase shifting oscillator means sets the phase difference between said two AC signals according to the resonance frequency band switched over to by said frequency band switchover means.

14. A drive control device for an ultrasonic motor according to claim 11, wherein said power amplifier means sets the voltage of said two AC signals according to the resonance frequency band switched over to by said frequency band switchover means.

15. A drive control device for an ultrasonic motor according to claim 11, further comprising an inductance insertion means which inserts, between said power amplifier means and said two input electrode groups provided on said electromagnetic energy to mechanical energy conversion element, an inductance value which depends upon the resonance frequency band switched over to by said frequency band switchover means.

16. A drive control device for an ultrasonic motor according to claim 11, wherein a common electrode is provided on said electromagnetic energy to mechanical energy conversion element as a said detector electrode.

17. A drive control device for an ultrasonic motor according to claim 11, wherein a common electrode is provided on said electromagnetic energy to mechanical energy conversion element and is divided into a plurality of portions, of which at least one portion serves as a said detector electrode.

18. A drive control device for an ultrasonic motor according to claim 11, wherein said two detector electrodes are positioned within one wavelength of said progressive wave apart.

19. A drive control device for an ultrasonic motor according to claim 11, wherein said frequency setting means, after said drive frequency of said ultrasonic motor has reached the frequency of the resonance frequency band switched over to by said frequency band switchover means, controls said drive frequency to lie within said resonance frequency band.

20. A drive control device for an ultrasonic motor according to claim 11, wherein said electromagnetic energy to mechanical energy conversion element is a piezoelectric transducer element.

21. A drive control device for an ultrasonic motor, in which two AC drive signals having a fixed phase difference are supplied to two input electrode groups on an electromagnetic energy to mechanical energy conversion element, and which drives a movable element by generating a progressive wave in a fixed element by said electromagnetic energy to mechanical energy conversion element, comprising:

a resonance order detection means that detects the order of the resonance frequency band of the AC drive signals based upon output signals from at least two detector electrodes that are provided on said electromagnetic energy to mechanical energy conversion element; and a frequency band control means that controls the frequency of said two AC drive signals to be within a predetermined order resonance frequency band, based upon the order of the resonance frequency band of the AC drive signals detected by said resonance order detection means.

22. A drive control device for an ultrasonic motor, in which two AC drive signals having a fixed phase difference are supplied to two input electrode groups on an electromagnetic energy to mechanical energy conversion element, and which drives a movable element by generating a progressive wave in a fixed element by said electromagnetic energy to mechanical energy conversion element, comprising:

a resonance order detection means that detects the order of the resonance frequency band of the AC drive signals based upon output signals from at least two detector electrodes that are provided on said electromagnetic energy to mechanical energy conversion element;

a frequency band control means that controls the frequency of said two AC drive signals to be within a predetermined order resonance frequency band based upon the order of the resonance frequency band of the AC drive signals detected by said resonance order detection means; and a drive frequency control means which, after the frequency of said two AC drive signals has reached the frequency of the predetermined order resonance frequency band, controls said frequency of said two AC drive signals to be a predetermined drive frequency.

* * * * *